(12) United States Patent
Jo et al.

(10) Patent No.: US 11,726,978 B2
(45) Date of Patent: Aug. 15, 2023

(54) COMPUTER PROGRAM FOR PROVIDING EFFICIENT CHANGE DATA CAPTURE IN A DATABASE SYSTEM

(71) Applicant: SILCROAD SOFT, Inc., Gyeonggi-do (KR)

(72) Inventors: Owook Jo, Gyeonggi-do (KR); Jeong Il Yoon, Gyeonggi-do (KR)

(73) Assignee: SILCROAD SOFT, INC., Suwon-si (KR)

( * ) Notice: Subject to any disclaimer, the term of this patent is extended or adjusted under 35 U.S.C. 154(b) by 88 days.

(21) Appl. No.: 17/055,956

(22) PCT Filed: Apr. 17, 2020

(86) PCT No.: PCT/KR2020/005159
§ 371 (c)(1),
(2) Date: Nov. 16, 2020

(87) PCT Pub. No.: WO2020/213985
PCT Pub. Date: Oct. 22, 2020

(65) Prior Publication Data
US 2022/0027338 A1 Jan. 27, 2022

(30) Foreign Application Priority Data
Apr. 18, 2019 (KR) .................. 10-2019-0045206

(51) Int. Cl.
*G06F 11/14* (2006.01)
*G06F 16/23* (2019.01)
*G06F 16/21* (2019.01)

(52) U.S. Cl.
CPC ...... *G06F 16/2358* (2019.01); *G06F 11/1451* (2013.01); *G06F 11/1471* (2013.01); *G06F 16/214* (2019.01)

(58) Field of Classification Search
CPC ............. G06F 16/214; G06F 16/2358; G06F 11/1451; G06F 11/1471
See application file for complete search history.

(56) References Cited

U.S. PATENT DOCUMENTS 6,658,589 B1 * 12/2003 Taylor ................ G06F 11/1471
714/E11.13
6,999,977 B1   2/2006 Norcott et al.
(Continued)

FOREIGN PATENT DOCUMENTS

KR      101823130 B1    3/2018
KR    1020180076172 A   7/2018
(Continued)

*Primary Examiner* — Eliyah S. Harper
(74) *Attorney, Agent, or Firm* — Umberg Zipser LLP

(57) ABSTRACT

An exemplary embodiment of the present disclosure discloses a computer program stored a non-transitory computer readable storage medium. When the computer program is executed by one or more processors, the computer program performs operations for Change Data Capture (CDC) by one or more processors, and the operations include: extracting a change data from at least one redo log of an online redo log and an archive redo log; analyzing at least one information of a resource utilization rate information and a remain log information of a source database server; and determining to process the change data in one mode of a first mode saving the change data as a CDC file and a second mode recording the change data in a memory, based on at least one of the remain log information and the resource utilization rate information.

21 Claims, 11 Drawing Sheets

(56) References Cited

U.S. PATENT DOCUMENTS

| | | |
|---|---|---|
| 7,111,023 B2 | 9/2006 | Norcott |
| 7,647,354 B2 | 1/2010 | Norcott |
| 7,657,576 B1 | 2/2010 | Norcott |
| 9,563,655 B2 * | 2/2017 | Chen ................. G06F 16/27 |
| 9,727,624 B2 | 8/2017 | Zhu |
| 10,102,266 B2 * | 10/2018 | McGee ............... G06F 16/275 |
| 10,649,855 B2 * | 5/2020 | Chinnam ............ G06F 9/45558 |
| 2002/0103816 A1 * | 8/2002 | Ganesh ............... G06F 11/1474 |
| | | 714/E11.12 |
| 2004/0122842 A1 * | 6/2004 | Friske ................ G06F 16/2228 |
| | | 707/999.102 |
| 2017/0315877 A1 * | 11/2017 | Kaplingat ........... G06F 11/1458 |
| 2018/0253483 A1 * | 9/2018 | Lee ..................... G06F 16/23 |
| 2019/0332594 A1 * | 10/2019 | Yoon .................. G06F 16/2358 |
| 2019/0361913 A1 | 11/2019 | Yoon et al. |
| 2019/0370368 A1 | 12/2019 | Kim et al. |

FOREIGN PATENT DOCUMENTS

| | | |
|---|---|---|
| KR | 1020180101941 A | 9/2018 |
| KR | 101917807 B1 | 11/2018 |
| KR | 1020190022660 A | 3/2019 |

* cited by examiner

[FIG. 1]
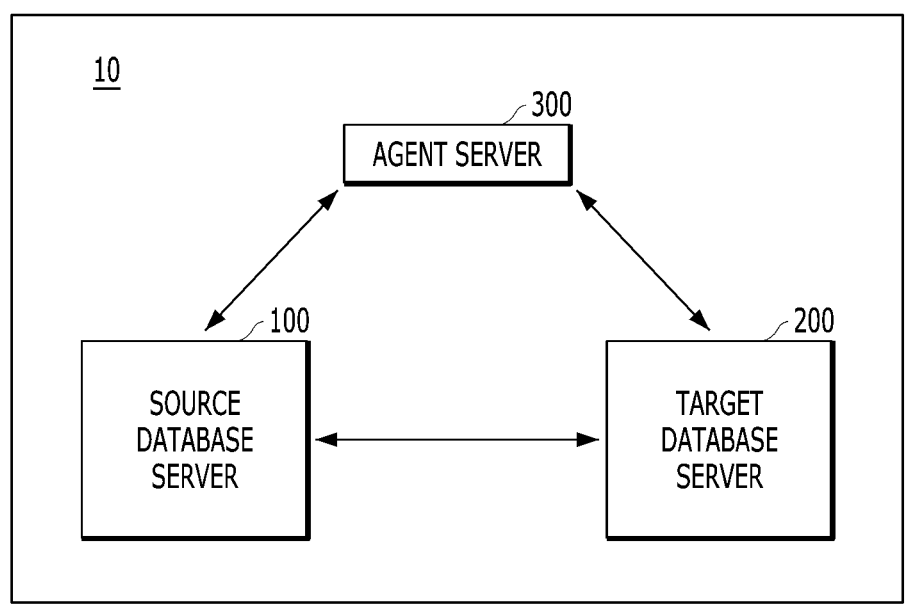

[FIG. 2]
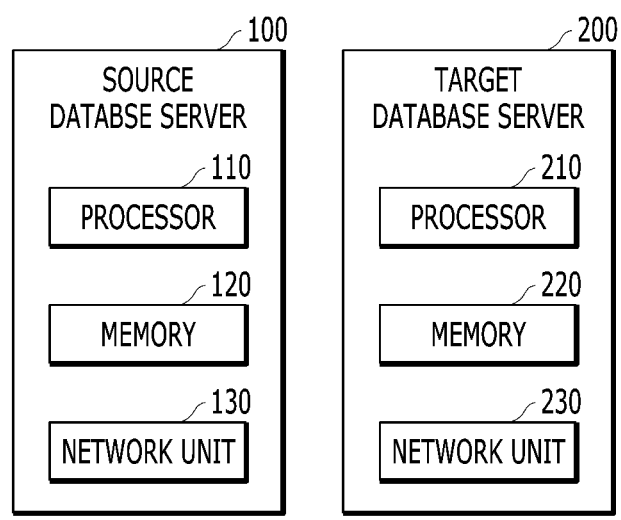

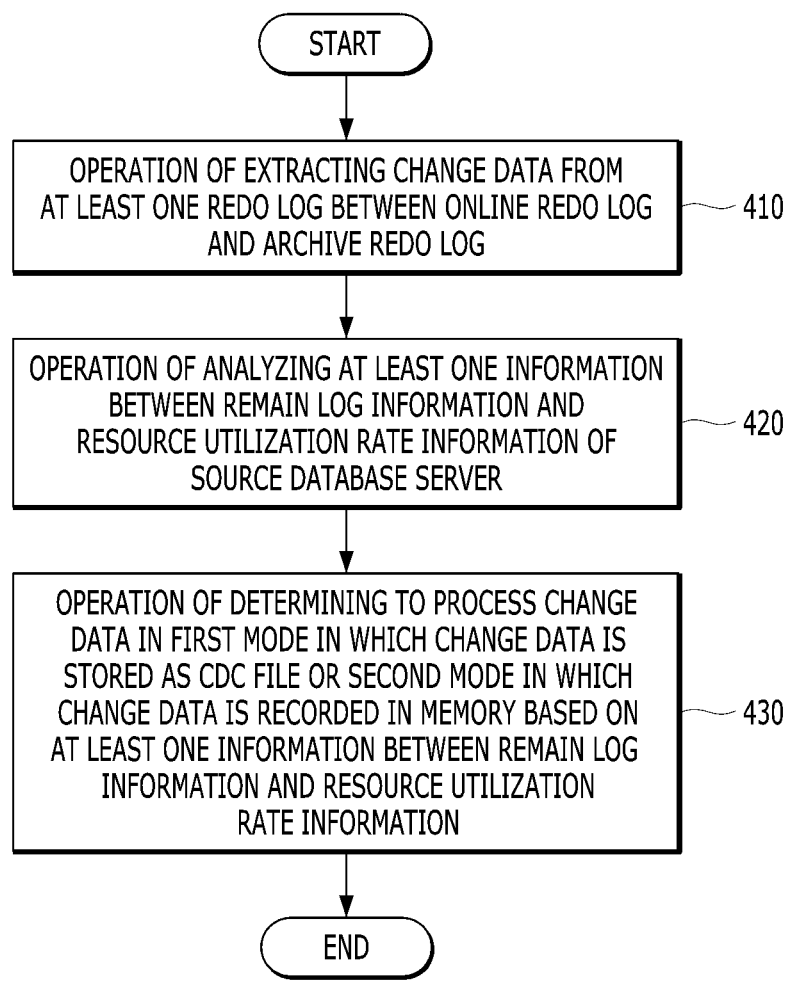

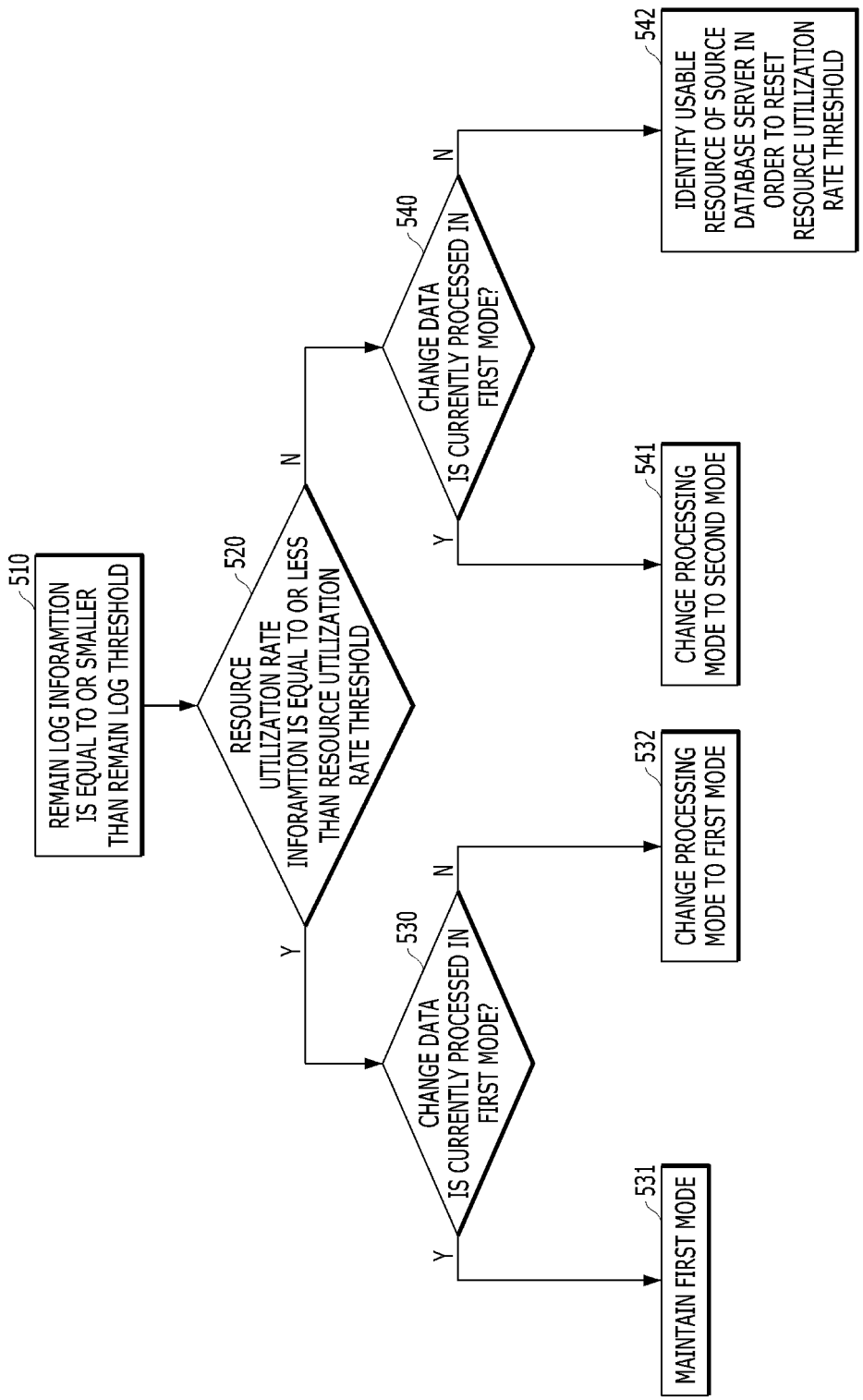
[FIG. 4]

[FIG. 5]
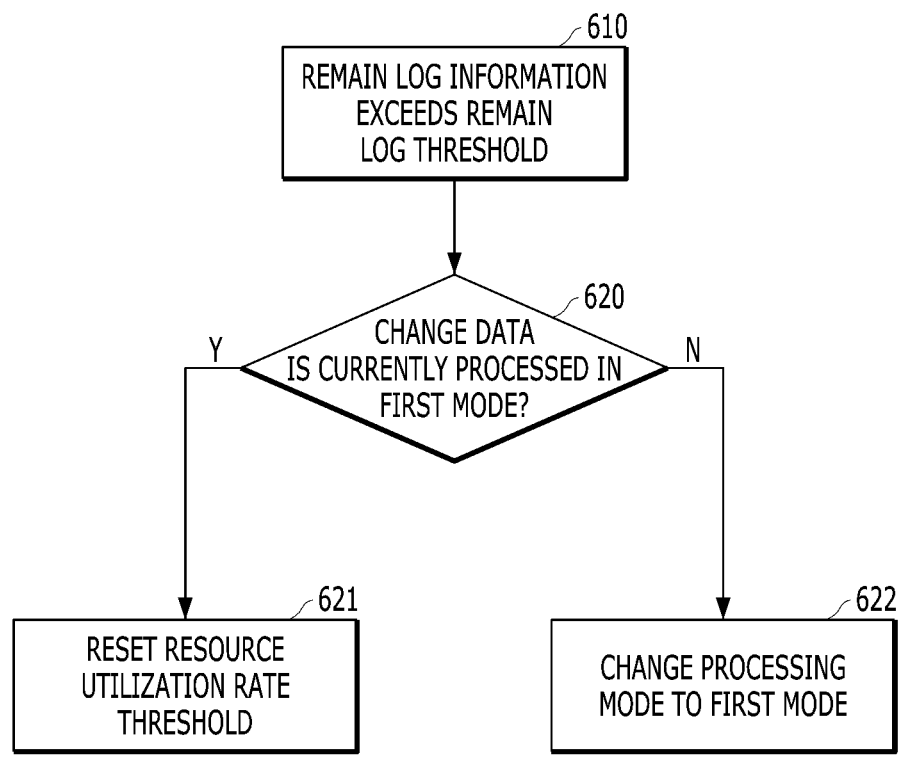

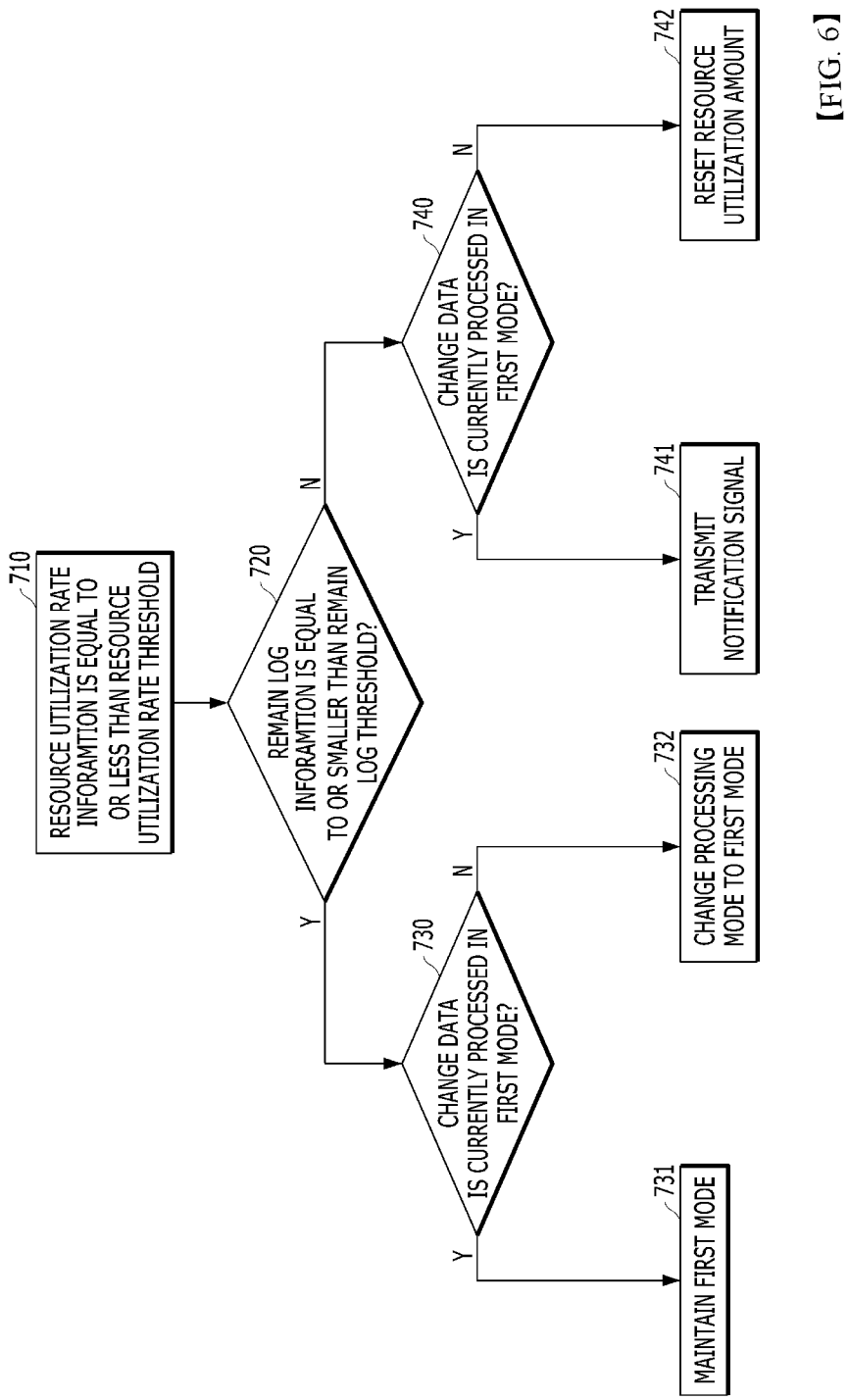
[FIG. 6]

[FIG. 7]
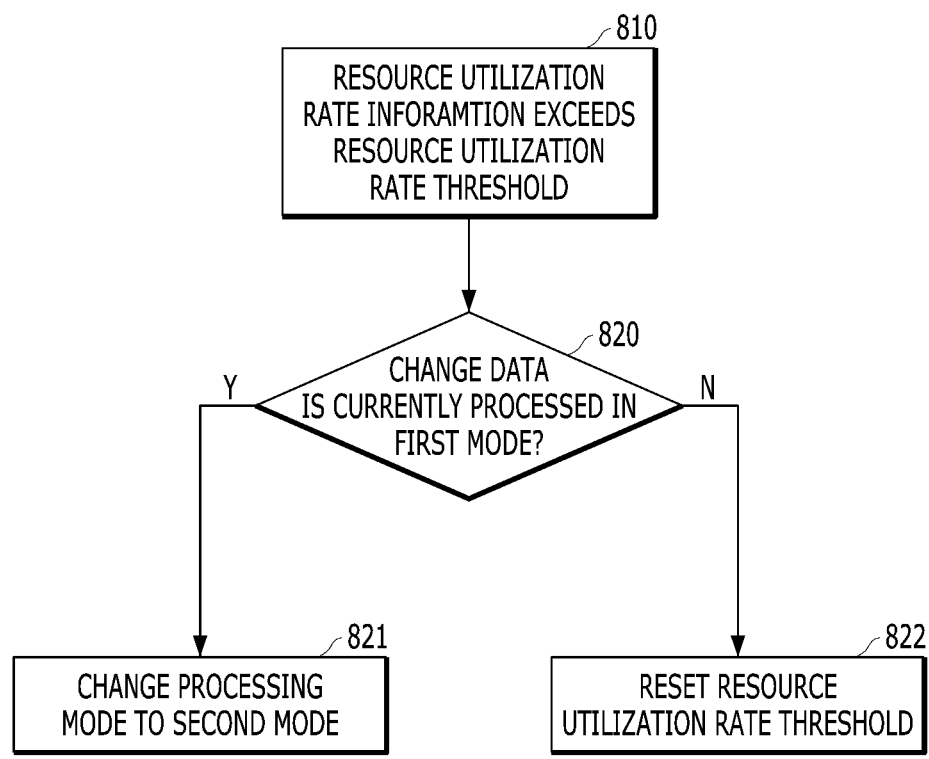

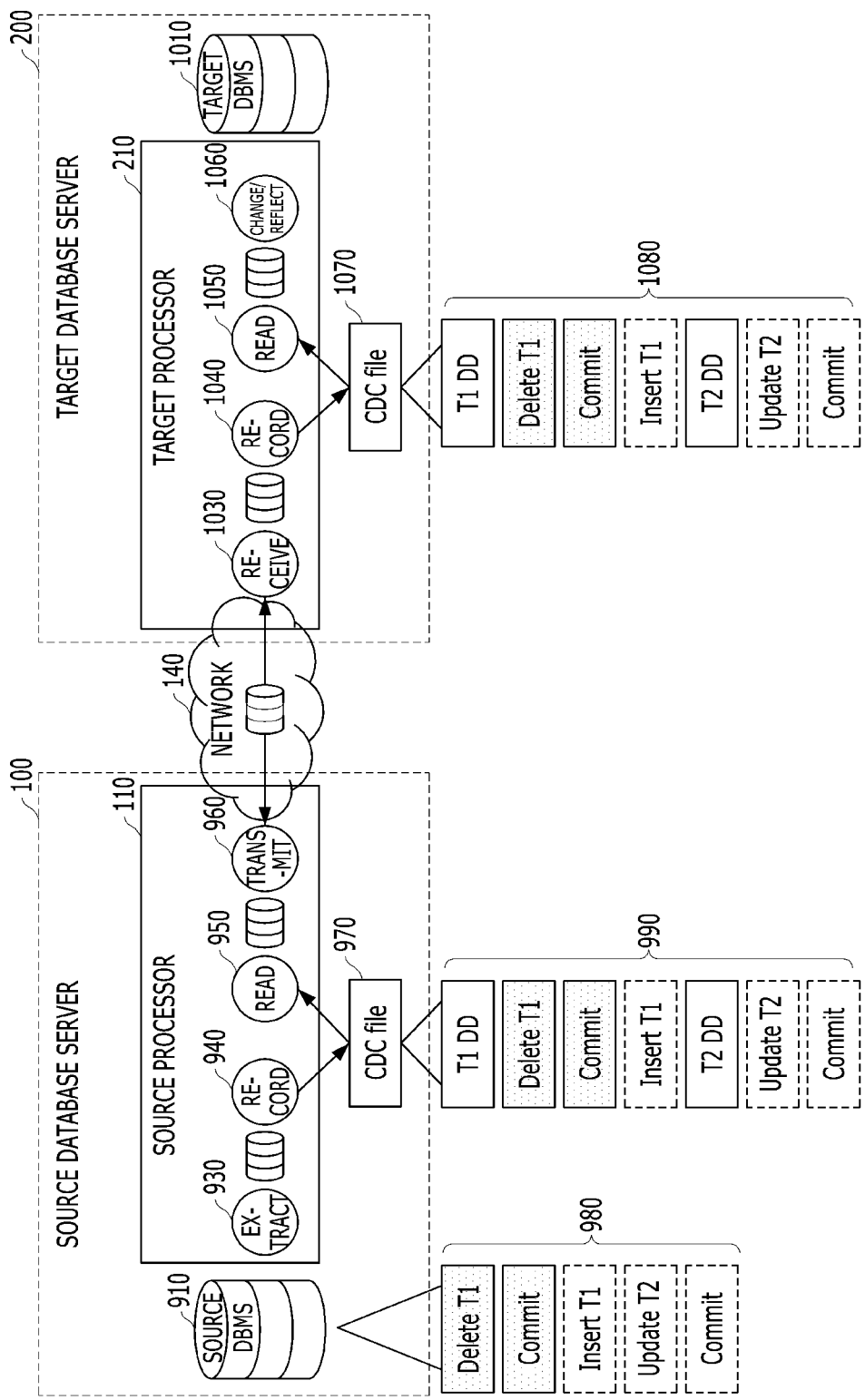
[FIG. 8]

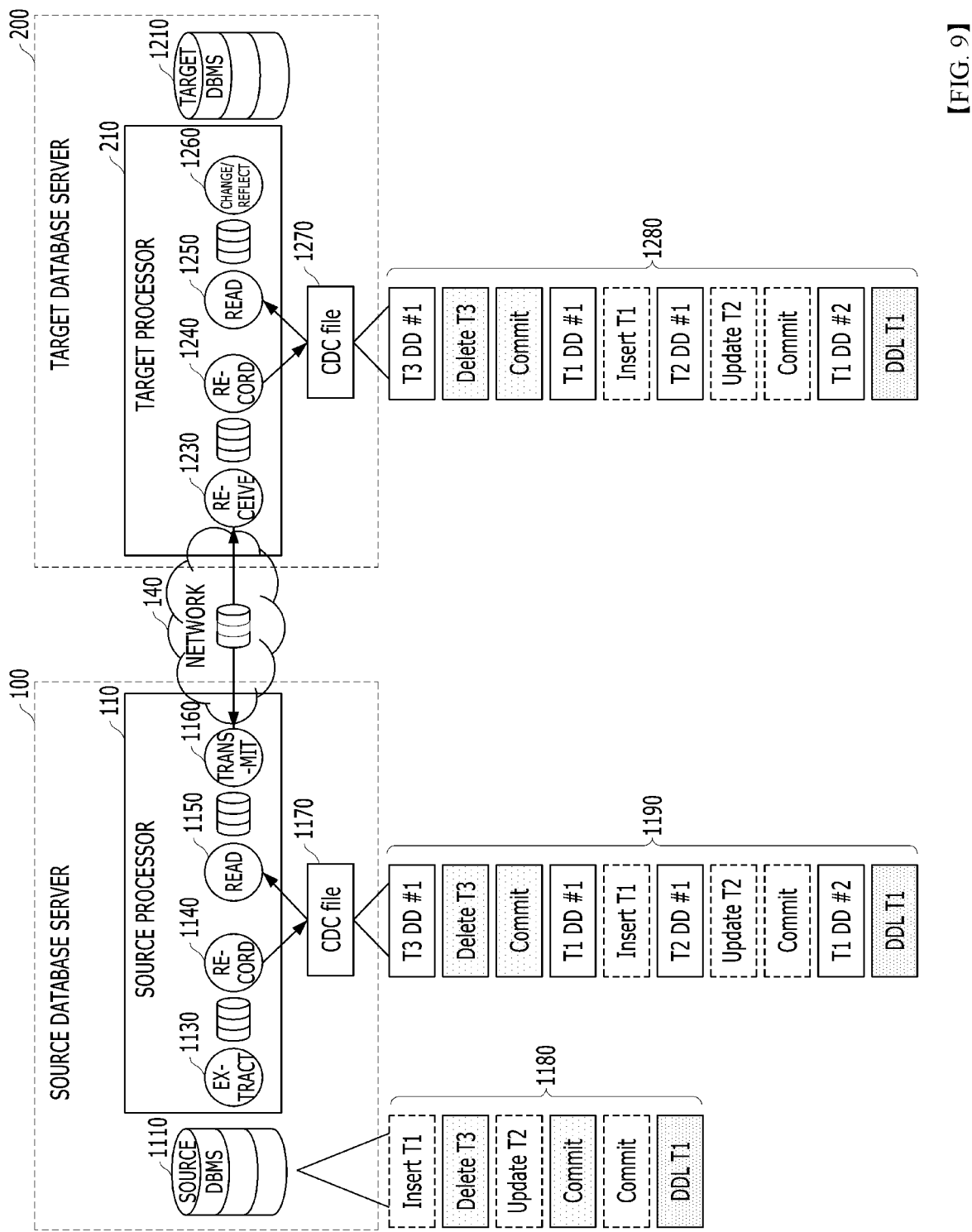
[FIG. 9]

[FIG. 10]
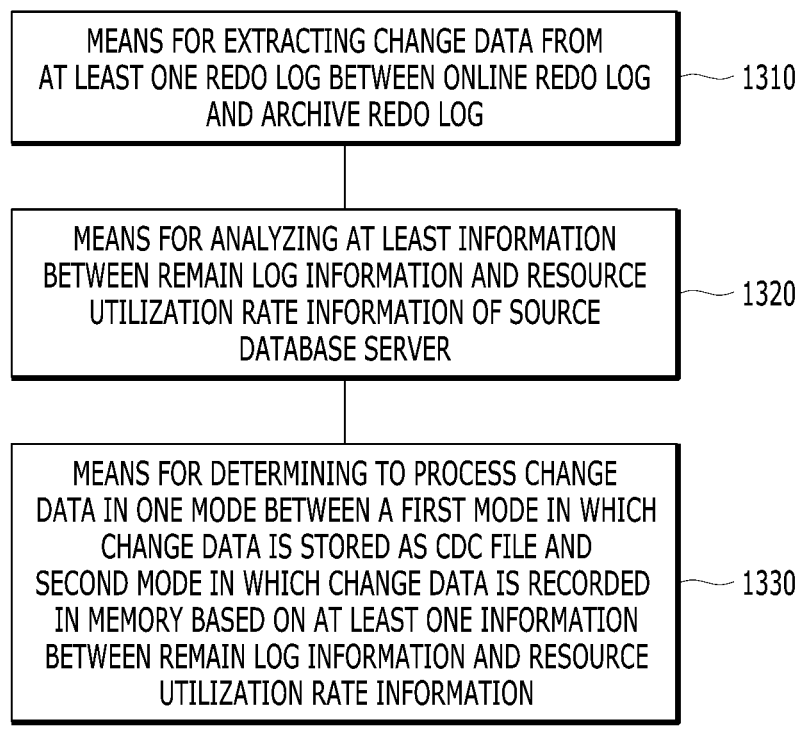

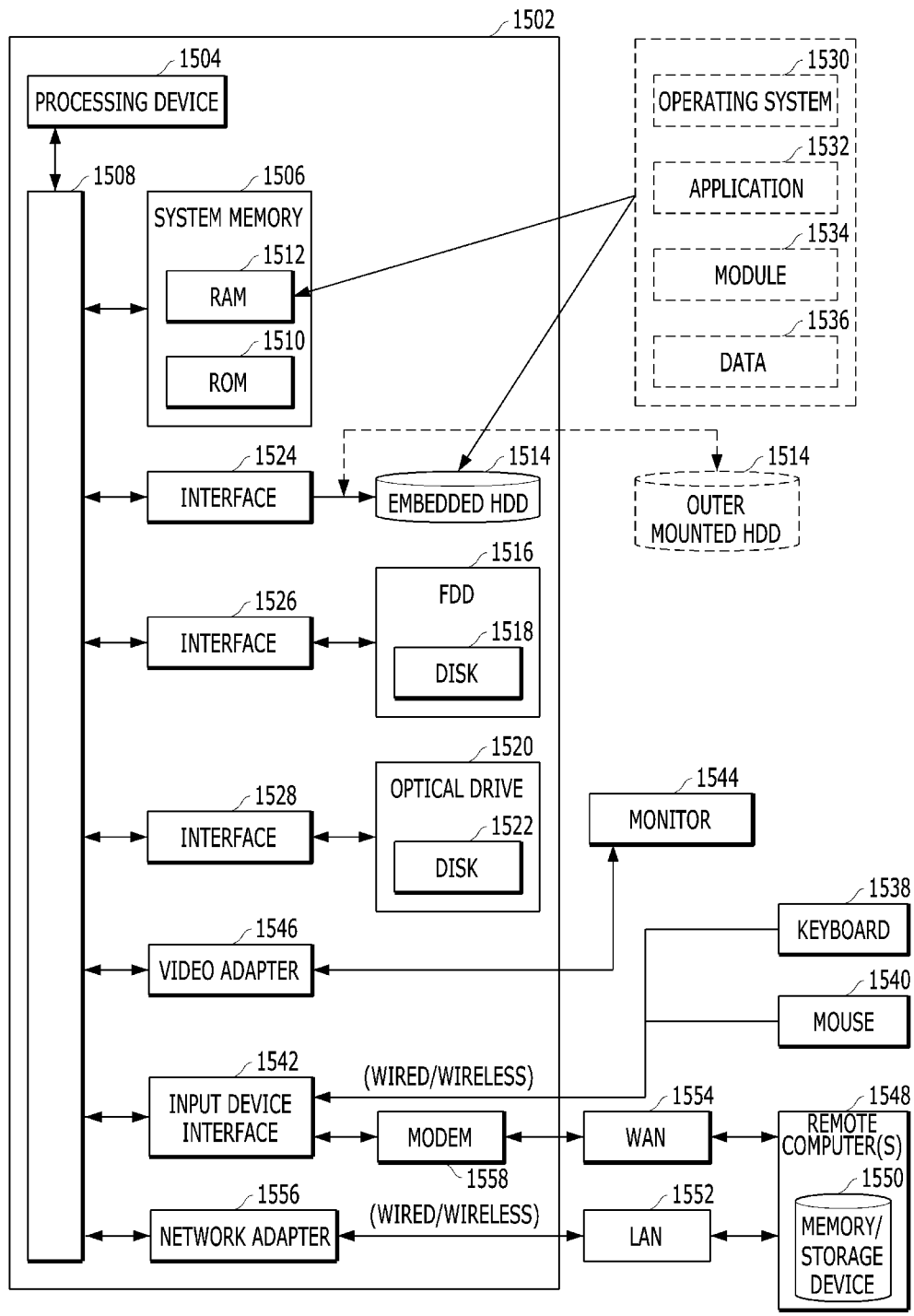
[FIG. 11]

COMPUTER PROGRAM FOR PROVIDING EFFICIENT CHANGE DATA CAPTURE IN A DATABASE SYSTEM

CROSS-REFERENCE TO RELATED APPLICATIONS

This application claims priority to and the benefit of Korean Patent Application No. 10-2019-0045206 filed in the Korean Intellectual Property Office on Apr. 18, 2019, the entire contents of which are incorporated herein by reference.

TECHNICAL FIELD

The present disclosure relates to a DataBase Management System (DBMS), and more particularly, to Change Data Capture (CDC).

BACKGROUND ART

Corporate business is expanding rapidly due to an explosive increase in data and the emergence of various environments and platforms. With an advent of a new business environment, more efficient and flexible data services, information processing, and data management functions are required. In line with the change, research on databases to solve the problems of high performance, high availability, and scalability, which are the basis of the corporate business implementation, is continuing.

Data managed within the corporate needs to be often migrated (or duplicated) from a source location to a target location and managed. For example, a database system for implementing banking operations may be divided into a database accessible by multiple external customers simultaneously and a database accessible by internal employees according to the characteristic of the accessing client. A solution that delivers change data from a source database system to a target database system is called Change Data Capture (CDC). The CDC may be implemented by, for example, a method of reading and interpreting a log file in a source database system and replaying change data in the source database system to a target database system that desires to duplicate the change data.

The CDC technology may extract data of the entire tables with the small number of sessions. Further, since the CDC technology does not directly access a data file, there is an advantage in that it is possible to decrease the utilization rate of resources in the DataBase Management System (DBMS).

In the meantime, it is possible to identify a change in data in the source database system by reading and interpreting a redo log including information about a transaction processed in the source database system for performing the CDC. The redo log is accumulated as the operation amount increases, and there is a limit in capacity to store redo logs due to the characteristic of a physical storage device. In particular, the redo log is sequentially stored in two or more redo log files, and when one redo log file is filled with the redo log, the redo log may be switched to and stored in another redo log file. However, there is a limit in the number of redo log files (that is, the capacity of the physical storage device) capable of storing the redo log. Accordingly, when all of the redo log files stored in the physical storage device are filled with the redo logs, a new redo log is overwritten in the redo log file that initially saved the redo log. When the new redo log is overwritten in the redo log file storing the existing redo log, there is a risk of loss of the existing redo log, so that the existing stored redo log is separately stored as an archived redo log.

PRIOR ART LITERATURE (Patent Document 1) U.S. Pat. No. 6,999,977
(Patent Document 2) U.S. Pat. No. 7,111,023
(Patent Document 3) U.S. Pat. No. 7,657,576
(Patent Document 4) U.S. Pat. No. 7,647,354
(Patent Document 5) U.S. Pat. No. 9,727,624

SUMMARY OF THE INVENTION

The present disclosure is conceived in response to the background art, and has been made in an effort to provide a computer program for providing efficient Change Data Capture (CDC).

An exemplary embodiment of the present disclosure for solving the problem discloses a computer program stored a non-transitory computer readable storage medium. If the computer program is executed by one or more processors the computer program performs operations for Change Data Capture (CDC) by one or more processors, and the operations comprises: extracting a change data from at least one redo log of an online redo log and an archive redo log; analyzing at least one information of a resource utilization rate information and a remain log information of a source database server; and determining to process the change data in one mode of a first mode saving the change data as a CDC file and a second mode recording the change data in a memory, based on at least one of the remain log information and the resource utilization rate information.

The remain log information is information for an online redo log and an archive redo log, which do not extract a change data, and wherein the resource utilization rate information is information for a resource utilization rate which the source database server currently uses.

The determining to process the change data in one mode of a first mode saving the change data as a CDC file and a second mode recording the change data in a memory, based on at least one of the remain log information and the resource utilization rate information, comprising: determining to process the change data in one mode of the first mode and the second mode, based on at least one of a comparison result between the remain log information and a remain log threshold and a comparison result between the resource utilization rate information and a resource utilization rate threshold.

The determining to process the change data in one mode of a first mode saving the change data as a CDC file and a second mode recording the change data in a memory, based on at least one of the remain log information and the resource utilization rate information, comprising: processing the change data in the first mode if the remain log information exceeds a remain log threshold.

The processing the change data in the first mode if the remain log information exceeds a remain log threshold, comprising: identifying that the change data is processed in one mode of the first mode and the second mode; determining to reset a resource utilization rate threshold if the change data is processed in the first mode; and converting from the second mode to the first mode if the change data is processed in the second mode.

The determining to process the change data in one mode of a first mode saving the change data as a CDC file and a second mode recording the change data in a memory, based on at least one of the remain log information and the resource utilization rate information, comprising: comparing the resource utilization rate information and a resource utilization rate threshold if the remain log information exceeds a remain log threshold; and determining to perform at least one operation of processing the change data in the first mode and determining to reset the resource utilization rate threshold, based on the comparison result.

The determining to perform one operation of operation for processing the change data in the first mode and operation for resetting the resource utilization rate threshold, based on the comparison result, comprising: resetting the resource utilization rate threshold if the resource utilization rate information exceeds the resource utilization rate threshold; and processing the change data in the first mode if the resource utilization rate information is the resource utilization rate threshold or less.

The determining to process the change data in one mode of a first mode saving the change data as a CDC file and a second mode recording the change data in a memory, based on at least one of the remain log information and the resource utilization rate information, comprising: identifying whether the resource utilization rate information exceeds a resource utilization rate threshold; and processing the change data in the second mode if the resource utilization rate information exceeds the resource utilization rate threshold.

The processing the change data in the second mode if the resource utilization rate information exceeds the resource utilization rate threshold, comprising: identifying that the change data is processed in one mode of the first mode and the second mode; converting from the first mode to the second mode if the change data is processed in the first mode; and identifying a usable resource of the source database server to reset the resource utilization rate threshold if the change data is processed in the second mode.

The determining to process the change data in one mode of a first mode saving the change data as a CDC file and a second mode recording the change data in a memory, based on at least one of the remain log information and the resource utilization rate information, comprising: determining to process the change data in one mode of the first mode and the second mode based on the resource utilization rate information, if the remain log information is a remain log threshold or less.

The determining to process the change data in one mode of the first mode and the second mode based on the resource utilization rate information, if the remain log information is a remain log threshold or less, comprising: identifying that the change data is processed in one mode of the first mode and the second mode if the resource utilization rate information exceeds a resource utilization rate threshold; converting from the first mode to the second mode if the change data is processed in the first mode; and identifying a usable resource of the source database server to reset the resource utilization rate threshold if the change data is processed in the second mode.

The determining to process the change data in one mode of the first mode and the second mode based on the resource utilization rate information, if the remain log information is a remain log threshold or less, comprising: identifying that the change data is processed in one mode of the first mode and the second mode if the resource utilization rate information is a resource utilization rate threshold or less; maintaining the first mode if the change data is processed in the first mode; and converting from the second mode to the first mode if the change data is processed in the second mode.

The remain log threshold is a criterion of the archive redo log and the online redo log which need to be extracted as the change data, wherein the resource utilization rate threshold is a criterion of a resource utilization rate which the source database server currently uses to store a change data extracted from at least one redo log of the online redo log and the archive redo log, as a CDC file, and wherein at least one of the remain log threshold and the resource utilization rate threshold are variable by machine learning based on an operation log of the source database server.

The change data comprises a first change data extracted from the archive redo log and a second change data extracted from the online redo log, and wherein the determining to process the change data in one mode of a first mode saving the change data as a CDC file and a second mode recording the change data in a memory, based on at least one of the remain log information and the resource utilization rate information, comprising: determining to process a processing mode of the second change data in one mode of the first mode and the second mode, based on at least one information of the remain log information and the resource utilization rate information, if processing for the second change data without processing for the first change data after finishing processing the first change data.

The computer program comprises: wherein a first change data extracted from the archive redo log and a second change data extracted from the online redo log; and further comprising: determining to change a mode for processing the second change data to correspond to a mode for processing the first change data if a mode for processing the first change data is changed.

The processing for the first change data and the processing for the second change data are processed in parallel.

The computer program further comprises: recording a meta information for an object, which occurs Structured Query Language (SQL) operation of objects of the source database server, to the CDC file; and wherein the meta information comprises at least one information of a table user information, a table name information, a column name information, a column order information, and a column type information.

The recording a meta information for an object, which occurs SQL operation of objects of the source database server, to the CDC file, comprising: generating a meta information for the object using Data Dictionary (DD) information for the object when there is no former record of SQL operation from the CDC file; and determining not to generate a meta information for the object, if there is a former record of SQL operation from the CDC file.

The recording a meta information for an object, which occurs SQL operation of objects of the source database server, to the CDC file, comprising: determining to record the meta information and SQL operation regarding the object to the CDC file if a meta information of the object is generated; and determining to record SQL operation regarding the object to the CDC file if a meta information regarding the object is not generated.

Another exemplary embodiment of the present disclosure provides a database server to implement Change Data Capture (CDC) comprises: processor comprising one or more of core; a memory storing executable program codes by the processor; and a network unit transmitting and receiving data from a source database server and a target database server; wherein the processor extracts a change data from at least one redo log of an online redo log and an archive redo log, analyzes at least one information of a resource utilization rate information and a remain log information of a source database server, and determines to process the change data in one mode of a first mode saving the change data as a CDC file and a second mode recording the change data in a memory, based on at least one of the remain log information and the resource utilization rate information.

Another exemplary embodiment of the present disclosure provides a method to implement Change Data Capture (CDC) comprising: extracting a change data from at least one redo log of an online redo log and an archive redo log; analyzing at least one information of a resource utilization rate information and a remain log information of a source database server; and determining to process the change data in one mode of a first mode saving the change data as a CDC file and a second mode recording the change data in a memory, based on at least one of the remain log information and the resource utilization rate information.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

FIG. 1 is a schematic diagram illustrating a database system according to an exemplary embodiment of the present disclosure.

FIG. 2 is a diagram illustrating an example of a source database server and a target database server in the database system according to the exemplary embodiment of the present disclosure.

FIG. 3 is a flowchart illustrating an example of a CDC file generating method performed in the source database server (or an agent server) according to the exemplary embodiment of the present disclosure.

FIG. 4 is a flowchart illustrating an example of a method of processing a redo log based on a remain log of a source database according to the exemplary embodiment of the present disclosure.

FIG. 5 is a flowchart illustrating an example of a method of processing a redo log based on a remain log of the source database according to the exemplary embodiment of the present disclosure.

FIG. 6 is a flowchart illustrating an example of a method of processing a redo log based on a resource utilization rate of the source database according to the exemplary embodiment of the present disclosure.

FIG. 7 is a flowchart illustrating an example of a method of processing a redo log based on a resource utilization rate of the source database according to the exemplary embodiment of the present disclosure.

FIG. 8 is a diagram schematically illustrating CDC operations performed in the database system according to the exemplary embodiment of the present disclosure.

FIG. 9 is a diagram schematically illustrating CDC operations performed in the database system according to the exemplary embodiment of the present disclosure.

FIG. 10 is a diagram illustrating means for performing CDC in the database system according to an exemplary embodiment of the present disclosure.

FIG. 11 is a simple and general schematic diagram illustrating an example of a computing environment in which exemplary embodiments of the present disclosure are implementable.

DETAILED DESCRIPTION

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. However, it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

In the case where change data is extracted by reading and interpreting an online or archive redo log, corresponding information may be recorded in a memory or stored in a file. However, in the case where the archive redo log is extracted, transaction increases in a source database, so that the reflection to a target database is delayed, there occurs failure in the target database, or a network between a source system and a target system is delayed. In the situation, in the case where the change data extracted from the archive redo log is recorded in the memory, the archive redo log may be deleted due to the limited capacity of a physical storage device, and further, when Change Data Capture (CDC) is interrupted, change data recorded in a volatile memory disappears, so that even though the CDC is re-operated, it is impossible to extract the change data existing in the deleted archive redo log. Accordingly, in the case where the change data is extracted from the archive redo log, corresponding information needs to be stored in a file, and when the corresponding information is stored in the file, disk I/O and a utilization rate of a CPU increase, so that a resource utilization rate of a corresponding system may sharply increase.

Accordingly, in order to extract a resultant of the extraction, that is, the change data, from the redo log and the archive redo log, there is a need for a technique for implementing a more efficient CDC by balancing a resource utilization rate of the system and extraction delay.

FIG. 1 is a schematic diagram illustrating a database system according to an exemplary embodiment of the present disclosure.

As illustrated in FIG. 1, a database system 10 may include a source database server 100, a target database server 200, and an agent server 300.

Although not illustrated in FIG. 1, the database system may further include a client. The client may mean a predetermined form of node(s) in a system having a mechanism for communicating with the database servers. For example, the client may include a Personal Computer (PC), a laptop computer, a work station, a terminal, and/or a predetermined electronic device having network accessibility. Further, the client may include a predetermined server implemented by at least one of an agent, an Application Programming Interface (API), and plug-in.

According to the exemplary embodiment of the present disclosure, operations of the source database server 100, the target database server 200, and/or the agent server 300, which will be described below, may be performed according to a query issued from a client.

The database servers 100 and 200 may include, for example, a predetermined type of computer system or computer device, such as a microprocessor, a main frame computer, a digital single processor, a portable device, and a device controller. Each of the database servers 100 and 200 may include a Database Management System (DBMS) and/or a persistent storage medium, which is not illustrated.

In the present specification, the source database server 100 and the target database server 200 may mean a predetermined form of node in the database system 10. As an additional exemplary embodiment, the source database server 100 and the target database server 200 may be combined in one database server and managed and/or clustered. The source database server 100 and the target database server 200 may be combined in one database server to form multiple linked databases.

According to the exemplary embodiment of the present disclosure, the source database server 100 and the target database server 200 may also mean heterogeneous database servers which are remotely located. Further, FIG. 1 illustrates the two database servers, but more than two database servers may also be included in the scope of the present disclosure.

Although not illustrated in FIG. 1, the database servers 100 and 200 may include one or more memories including a buffer cache. Further, although not illustrated in FIG. 1, the database servers 100 and 200 may include one or more processors. Accordingly, the DBMS within the database server may be operated by the processor in the memory.

Herein, the memory is a main storage device which a processor directly accesses, such as a Random Access Memory (RAM) including a Dynamic Random Access Memory (DRAM) and a Static Random Access Memory (SRAM), and may mean a volatile storage device in which stored information is instantly erased when a power supply is turned off, but is not limited thereto. The memory may be operated by a processor. The memory may store a data table including data values and log record according to a transaction. For example, the log records may also be stored in a separate constituent element in charge of storing separate transaction logs in the memory. In the present specification, the transaction may generally mean a continuous processing unit for a series of operations, such as exchanging information or updating a database. The transaction represents a basic unit of an operation for completing a requested operation in the state where integrity of the database is guaranteed. In the present disclosure content, the redo log data may include a data record capable of identifying change contents for a structure and an organization of data in the database (for example, change contents related to a table, a column, a row, a data type, and an index).

According to the exemplary embodiment of the present disclosure, the data value of the data table and/or the log records may be recorded from the memory to the persistent storage medium. In an additional aspect, the memory may include a buffer cache, and the data and/or log records may be stored in a block of the buffer cache. The data and/or log records may be recorded in the persistent storage medium by a background process.

The persistent storage medium within the database server means a non-volatile storage medium, which is capable of continuously storing predetermined data, such as a storage device based on a flash memory and/or a battery-backup memory, as well as a magnetic disk, an optical disk, and a magneto-optical storage device. The persistent storage medium may communicate with the processors and the memories of the database servers 100 and 200 through various communication means. In an additional exemplary embodiment, the persistent storage medium may be located outside the database servers 100 and 200 and communicate with the database servers 100 and 200.

The DBMS is a program for allowing the database servers 100 and 200 to perform operations, such as search, insertion, correction, and deletion of required data, and/or a log record management, and may be implemented by the processors in the memories of the database servers 100 and 200 as described above.

The client and the database servers 100 and 200 or the database servers 100 and 200 may communicate with each other through a network (not illustrated). The network according to the exemplary embodiment of the present disclosure may use various wire communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems. As an additional exemplary embodiment, the network in the present specification may also include a database link (dblink), and accordingly, the database servers 100 and 200 may communicate with each other through the database link and bring data/log records from the database servers 100 and 200 or another database server. The technologies described in the present specification may be used in other networks, as well as the foregoing networks.

As illustrated in FIG. 1, the source database server 100 may be located remotely from the target database server 200. Further, the source database server 100 and the target database server 200 may mean the same type of servers or heterogeneous database servers which are not compatible with each other.

The source database server 100 is a predetermined type of database and may include a device including a processor and a memory for executing and storing commands, but is not limited thereto. That is, the source database may also include software, firmware, hardware, or a combination thereof. The software may include an application(s) for generating, deleting, and correcting a database table, schema, index, and/or data. The source database server 100 may receive transactions from a client or anther computing device, and for example, the transactions may include search, addition, correction, and/or deletion of data, a table, and/or an index in the source database server 100.

The target database server 200 may mean a database server to which data change content generated in the source database server 100 is copied or synchronized, and may include at least a part of the foregoing characteristics of the source database server 100. For example, the target database server 200 may store copies of data, data types, tables, indexes, and/or log records of the source database server 100.

In the present specification, the log record may mean data record that is capable of identifying change contents for the structure and the organization of the data within the database and/or change contents related to the table, the column, the data type, the index, and the data. The redo log may mean information for uniquely identifying a transaction or computation, and/or information for identifying the data record changed according to the transaction or the computation.

According to the exemplary embodiment of the present disclosure, the agent server 300 may mean a separate entity for implementing the CDC between the source database server 100 and the target database server 200. Accordingly, the agent server 300 may perform predetermined operations for implementing the CDC. For example, in the present disclosure contents, the agent server 300 may receive and process data from the source database server 100, and then allow the change data to be applied in the target database server 200 by transmitting the processed data to the target database server 200.

The agent server 300 is a predetermined type of server and may include a device including a processor and a memory for executing and storing commands, but is not limited thereto. The agent server 300 may also include software, firmware, hardware, or a combination thereof. For example, the software implementing the operations of the agent server 300 may be installed in the source database server 100 and/or the target database server 200. In the example, a CDC module may be installed in the source database server 100 and/or the target database server 200 to allow CDC characteristics between the source database server 100 and the target database server 200 to be implemented.

The functions of the agent server 300 illustrated in FIG. 1 may also be integrated into the source database server 100 and/or the target database server 200 as a part. For example, the CDC function of the agent server 300 may be replaced by the target database server 200.

FIG. 2 is a diagram illustrating an example of the source database server and the target database server in the database system according to the exemplary embodiment of the present disclosure.

As illustrated in FIG. 2, the source database server 100 may include a processor 110, a memory 120, and a network unit 130. The foregoing components are illustrative, and the scope of the present disclosure is not limited to the foregoing components. That is, depending on an implementation aspect for the exemplary embodiments of the present disclosure contents, additional components may be included or some of the foregoing components may be omitted.

According to the exemplary embodiment of the present disclosure, the source database server 100 may include the network unit 130 which transceive data with the target database server 200 and the agent server 300. Further, the network unit 130 may provide a communication function with the database servers 110 and 120 and/or a communication function with a client. For example, in the case where the network unit 130 is located outside the source database server 100, the network unit 130 may receive extracted log records from the source database server 100. The network unit 130 may allow communication between the database servers 110 and 120 by using a predetermined network and/or a database link. The network unit 130 may receive an input from a client. For example, the network unit 130 may receive a request related to data storage, change, and inquiry and index building, change, and inquiry from the client. In addition, the network unit 130 may allow information transmission between the database servers by a method of calling a procedure from the database server. Further, the network unit 130 may provide a function of transceiving predetermined data/information transmitted between the database servers in relation to database duplication.

The network unit 130 may transmit the received CDC file or information recorded in the CDC file to the source database server 100. The network unit 130 may also convert the CDC file or the information recorded in the CDC file into a format appropriate to the target database server 200 and transmit the converted format to the target database server 200.

According to the exemplary embodiment of the present disclosure, the memory 120 may store predetermined data stored in relation to the performance of the CDC characteristic according to the exemplary embodiments of the present disclosure contents, such as storing the extracted log record. The memory 120 may be included in the DBMS and/or the persistent storage medium. In addition, the memory 120 may perform the storage related to an update request. The memory 120 may determine to store a data table, an index table, and the like. The memory 120 may also determine a storage location in the data table and a storage location in the persistent storage medium for the data.

The processor 110 may store a redo log including information about a transaction processed in the source database server 100 in at least one redo log storage place. The redo log may include a data record capable of identifying change contents (for example, a table, a column, a row, a data type, and an index) for a structure and an organization of the data in the database. That is, the processor 110 may sequentially store the redo log including information about a transaction generated according to a change in a structure and an organization of the data in the database in one or more online redo log storage places, and when all of the one more online redo log storage places are saturated with the redo logs, the processor 110 may store a newly generated redo log in the first online redo log storage place. In this case, the processor 110 may extract the redo log previously stored in the existing first redo log storage place and store the extracted redo log as an archive redo log. That is, in the case where the newly generated redo log is stored in the first redo log storage place, there is a risk in loss of the record for the existing stored redo log, so that the processor 110 extracts the existing stored redo log as the archive redo log.

According to the exemplary embodiment of the present disclosure, the processor 110 may extract change data from at least one redo log between an online redo log and an archive redo log. In particular, the processor 110 may extract change data by reading and interpreting the redo log (online and/or archive redo log) including information about the transaction processed in the source database system and/or by identifying change in the data in the source database system.

The processor 110 may analyze at least one information between remain log information and source utilization rate information of the source database server. The remain log information may be information about at least one of the online redo log and the archive redo log from which the change data was not extracted. In particular, the remain log information may be information about a difference between the redo log (online and/or archive redo log) including information about the transaction generated according to the change in the structure and the organization of the data in the database and the change data extracted by the processor 110 from at least a part of the redo log.

For example, the remain log information may be information on a difference between a size of the redo log including the information about the transaction for the data change in the database and a size of the change data extracted and generated from at least a part of the redo log. In the case where a transaction for a data change is received from a client, a size of the redo log corresponding to the corresponding transaction is 100 MB, and a size of the change data generated by extracting at least a part of the redo log by the processor 110 is 20 MB, the remain log information may include information on 80 MB that is a difference between the size of the redo log and the size of the change data extracted and generated from at least a part of the redo log. The particular description for the size of the redo log is merely illustrative, and the present disclosure is not limited thereto.

For another example, the remain log information may be information on a difference between an identification number of the redo log real-time possessed in response to the data change in the database and an identification number of the change data generated by extracting at least a part of the redo log. In the case where the identification number of the real-time possessed redo log is 100 (that is, in the case where 100 redo logs are possessed in response to 100 transactions are possessed), and an identification number of the change data most recently extracted and generated from at least a part of the redo log is 20, the remain log information may include information indicating that the difference between the identification number of the redo log and the identification number of the change data extracted and generated from at least a part of the redo log is 80. That is, the remain log information may include information based on the fact that it is possible to identify a difference between the real-time stored redo log and the change data extracted from at least a part of the redo log through the identification number of each of the redo logs generated in response to the 100 transactions. The description for the particular size of the identification number of the redo log is merely illustrative, and the present disclosure is not limited thereto.

The resource utilization rate information may be information about a computing resource currently used by the source database, and for example, include information about a disk input/output utilization rate (disk I/O), a CPU utilization rate, and a memory utilization rate.

That is, the source database server 100 analyzes the remain log information and the resource utilization rate information of the source database server 100 to efficiently perform the CDC. Hereinafter, the method of efficiently processing the redo log in the source database server 100 by analyzing and acquiring the remain log information and the resource utilization rate information by the source database server 100 will be described.

The processor 110 may determine to process the archive redo log in one mode between a first mode in which the archive redo log is stored as a CDC file or a second mode in which the archive redo log is recorded in the memory based on at least one information between the remain log information and the resource utilization rate information of the source database server 100.

The processor 110 may extract change data by reading and interpreting the online redo log and the archive redo log. However, in the case where the processor 110 extracts the archive redo log from the redo log storage place, transaction increases in the source database server 100 to cause a delay to the system, such as the reflection to the target database server 200 is delayed, there occurs failure in the target database server 200, or a network between a source system and a target system is delayed. Accordingly, it is possible to prevent the delay of the database system by converting the change data extracted from the archive redo log into a file. However, when the change data is converted into the file, the disk I/O and the utilization rate of the CPU increase, so that the resource of the database system is excessively used.

That is, the processor 110 may adjust a balance between the delay in the system occurring when the archive redo mode is extracted and the excessive system resource use occurring when the change data is converted into a file and stored by changing the process for the change data to the first mode or the second mode based on at least one of the remain log information and the resource utilization rate information.

According to the exemplary embodiment of the present disclosure, the source database server 100 may determine to process the change data in one mode between the first mode in which the change data is stored as a CDC file or a second mode in which the change data is recorded in the memory based on at least one between the remain log information and the resource utilization rate information.

In particular, the processor 110 may determine to process the change data in one mode between the first mode and the second mode based on at least one comparison result between a comparison result of the remain log information and a remain log threshold and a comparison result of the resource utilization rate information and a resource utilization rate threshold. The remain log threshold may be information on a threshold that is a reference of the redo log which needs to be extracted as change data. In particular, the remain log threshold may include information on an allowable value for a difference between the redo log real-time possessed in the database and the change data extracted from at least a part of the redo log. The resource utilization rate threshold information may be a reference of the resource utilization rate currently used by the source database server for storing the archive redo log as the CDC file.

When the remain log information exceeds the remain log threshold, the processor 110 may process the archive redo log in the first mode. For particular example, when the remain log information includes information of 80 MB that is the difference between the size of the real-time possessed redo log and the size of the change data extracted from at least a part of the redo log, and the remain log threshold includes information of 60 MB that is the allowable value of the difference between the size of the redo log and the size of the change data extracted from at least a part of the redo log, the processor 110 may determine that the remain log information exceeds the remain log threshold and process the change data in the first mode. The description for the particular sizes of the remain log information and the remain log threshold is merely illustrative, and the present disclosure is not limited thereto.

For another example, when the remain log information includes information of 80 that is the difference between the identification number of the real-time possessed redo log and the identification number of the change data extracted from at least a part of the redo log, and the remain log threshold includes information of 70 that is the allowable value of the difference between the identification number of the redo log and the identification number of the change data extracted from at least a part of the redo log, the processor 110 may determine that the remain log information exceeds the remain log threshold and process the change data in the first mode. The description for the particular sizes of the remain log information and the remain log threshold is merely illustrative, and the present disclosure is not limited thereto.

According to the exemplary embodiment of the present disclosure, when the remain log information exceeds the remain log threshold, the processor 110 may determine to perform at least one operation between an operation of determining to reset the resource utilization rate based on the mode in which the change data is processed and an operation of changing the second mode to the first mode. A particular description thereof will be described below with reference to FIG. 5.

Referring to FIG. 5, the processor 110 may identify a time point at which the remain log information exceeds the remain log threshold (610). The fact that the remain log information exceeds the remain log threshold may mean that a difference between the real-time possessed redo log and the change data extracted from at least a part of the redo log is relatively large (that is, the difference between the redo log and the change data exceeds the remain log threshold). That is, the change data extracted from the redo log (online and/or archive redo log) is little, which may mean that the amount of possessed archive redo log extracted from the redo log storage place in the current memory of the source database server 100 is large.

When the remain log information exceeds the remain log threshold, the processor 110 may identify that the change data is currently processed in one mode between the first mode and the second mode (620). That is, in the situation where the amount of possessed archive redo log currently extracted in the memory is large, the processor 110 may identify whether the corresponding change data is stored at a CDC file (that is, the first mode) or is recorded in the memory (that is, the second mode).

Further, when the change data is not currently processed in the first mode as the result of the identification 620 (that is, the change data is processed in the second mode in which the change data is recorded in the memory), the processor 110 may change the second mode to the first mode so that the change data is processed in the first mode (622). In detail, the situation where the remain log information exceeds the remain log threshold and the change data is processed in the second mode may be the situation where the change data is processed in the second mode in which the change data (the change data extracted from the online and/or archive redo log) is continuously recorded in the memory despite the fact that there are currently many archive redo modes in the memory (that is, the difference between the online redo log and the archive redo log is large). The archive redo log has a storage period (for example, one day, one week, or one month), and the archive redo log after the storage period may be backed up to another system or deleted. Accordingly, when the CDC is performed through the redo log, it is important to store the archive redo log as a file as quickly as possible and follow the online redo log. That is, the change data includes the change data extracted from the archive redo log, so that the processor 110 may make the change data extracted from the archive redo log follow the online redo log including the information about the transaction real-time processed in the database system by changing the second mode to the first mode so that the change data (that is, the change data extracted from the archive redo log) is processed in the first mode in the foregoing situation.

The processor 110 may identify that the remain log information exceeds the remain log threshold and the change data is currently processed in the first mode. When the change data is currently processed in the first mode (that is, the archive redo log is stored as the CDC file), the processor 110 may perform an operation of resetting a resource utilization amount (621). In detail, the situation where the remain log information exceeds the remain log threshold and the change data is processed in the first mode may be the situation where many archive redo logs are currently possessed in the memory (that is, the difference between the redo log and the change data is large) and the change data is processed in the first mode in which the change data is stored as the file. That is, the situation where the remain log information exceeds the remain log threshold and the change data is processed in the first mode may be the situation where there occurs a difference between online redo log and the change data extracted from the archive redo log (that is, the amount of possessed archive redo log in the memory is large) despite the fact that the processor 110 performs the first mode in which the many change data extracted from the archive redo log currently possessed in the memory is currently stored as the file and processed. Accordingly, the processor 110 may determine that the resources usable for performing the first mode in which the current change data is stored as the CDC file are insufficient and reset the resource utilization rate threshold. For example, the reset of the resource utilization rate threshold may additionally allocate a CPU resource in order to process the change data in the first mode. In an additional exemplary embodiment, the processor 110 may generate a notification signal to help the client to allocate an additional resource for performing the corresponding operation and transmit the notification signal to the client. The particular description for the reset of the resource utilization amount threshold is merely illustrative, and the present disclosure is not limited thereto.

According to the exemplary embodiment of the present disclosure, when the remain log information is equal to or smaller than the remain log threshold, the processor 110 may determine to perform at least one operation among the operation of determining to reset the resource utilization amount, the operation of changing the second mode to the first mode, and the operation of maintaining the first mode based on the mode in which the change data is processed. A particular description thereof will be described below with reference to FIG. 4.

Referring to FIG. 4, the processor 110 may identify a time point at which the remain log information is equal to or smaller than the remain log threshold (510). The fact that the remain log information is equal to or smaller than the remain log threshold may mean that the difference between the redo log and the change data is small (that is, the change between the redo log and the change data is equal to or smaller than the remain log threshold). That is, the change data extracted from the redo log (in this case, the archive redo log) is many, which may mean that the archive redo logs currently possessed in the memory of the source database server 100 are relatively less (that is, the situation where the difference between the archive redo log and the online redo log is relatively little).

When the remain log information is equal to or smaller than the remain threshold, the processor 110 may identify whether the resource utilization rate information is equal to or smaller than the resource utilization amount threshold (520). The fact that the remain log information is equal to or smaller than the remain threshold and the resource utilization rate information is equal to or smaller than the resource utilization amount threshold may mean the situation where the relatively small amount of archive redo logs are currently possessed in the memory and the resources are adequate to process the archive redo log in the first mode. That is, the situation may be the situation where the difference between the redo log and the change data is little, and the resource is sufficient to store the change data as the CDC file.

In this case, the processor 110 may identify that the change data is currently processed in at least one mode between the first mode and the second mode (530). That is, the processor 110 may identify whether the change data is stored as the CDC file (that is, the first mode) or is recorded in the memory (the second mode) at the time point at which the amount of archive redo logs currently possessed in the memory is little and it is determined that the resource is adequate to process the archive redo log in the first mode.

When the change data is not currently processed in the first mode as the result of the identification 530 (that is, the change data is processed in the second mode in which the change data is recorded in the memory), the processor 110 may change the second mode to the first mode so that the change data is processed in the first mode (532). In detail, the situation where the remain log information is equal to or smaller than the remain log threshold, the resource utilization rate information is equal to or smaller than the resource utilization rate threshold, and the change data is processed in the second mode may be the situation where the change data is processed in the second mode in which the change data is recorded in the memory in the situation where the amount of archive redo logs currently possessed in the memory is small and the resource is sufficient to process the change data extracted from the redo log in the first mode. In this case, the processor 110 may change the second mode to the first mode so that the change data is processed in the first mode (532). That is, the change data includes the change data extracted and generated from the archive redo log, so that the processor 110 may make the archive redo log follow the online redo log including information about the transaction realtime processed in the database system by storing the change data extracted from the archive redo log as the CDC file (the first mode).

When the remain log information is equal to or smaller than the remain log threshold, the resource utilization rate information is equal to or smaller than the resource utilization rate threshold, and the change data is processed in the first mode, the processor 110 may maintain the first mode so that the additionally generated change data is processed in the first mode (531).

That is, when the remain log information and the resource utilization rate information are equal to or smaller than the thresholds, respectively (that is, when the difference between the redo log and the archive redo log is small and the sufficient resources for storing the change data as the file are secured), the processor 110 may process the change data in the first mode in which the change data is stored as the CDC file.

When the remain log information is equal to or smaller than the remain log threshold, the processor 110 may identify that the resource utilization rate information exceeds the resource utilization rate threshold. The fact that the remain log information is equal to or smaller than the remain log threshold and the resource utilization rate information exceeds the resource utilization amount threshold may mean that the relatively little archive redo logs are currently possessed in the memory and the resource is insufficient to process the change data in the first mode. That is, the extraction of the archive redo log from the redo log storage place is little, so that the delay does not occur in the system, but the resource for storing the change data as the CDC file may not be sufficient.

In this case, the processor 110 may identify that the change data is currently processed in at least one mode between the first mode and the second mode (540). That is, the processor 110 may identify that the change data is processed in at least one mode between the first mode in which the change data is stored as the CDC file and the second mode in which the change data is recorded in the memory at the time point at which the amount of archive redo log currently possessed in the memory is small and it is determined that the resource for processing the change data in the first mode is insufficient.

When the change data is currently processed in the first mode as the result of the identification 540, the processor 110 may change the first mode to the second mode so that the change data is processed in the second mode (541). That is, the processor 110 may determine that the difference between the redo log and the change data is little in the foregoing situation (that is, the difference between the online redo log and the change data extracted from the archive redo log is little) and the resource for storing the change data as the CDC file is not sufficient and change the first mode in which the amount of system resources used is large to the second mode in which the amount of system resources used is small to process the change data in the second mode.

When the change data is currently processed in the second mode as the result of the identification 540, the processor 110 may identify an available resource of the source database server for resetting the resource utilization rate threshold (542).

When it is identified that the available resource of the source database server for resetting the resource utilization rate threshold is sufficient (that is, when there is an additional resource to be allocated to the source database), the processor 110 may reset the resource utilization rate threshold by allocating the additional resource to the source database server 100. That is, this case may be the situation where the resource utilization rate threshold is set excessively low, so that the change data is not processed despite the large amount of current available resources of the source database server 100. Accordingly, in the case where the amount of available resources is large, the change data may be stored as the CDC file by resetting the resource utilization rate threshold.

According to the exemplary embodiment of the present disclosure, when the resource utilization rate information exceeds the resource utilization rate threshold, the processor 110 may process the change data in the second mode. The resource utilization rate threshold may be the threshold that is a reference of a currently used resource utilization rate of the source database server for storing the change data as the CDC file. The resource utilization rate threshold may be pre-determined by a client. A detailed description thereof will be provided below with reference to FIG. 7.

Referring to FIG. 7, the processor 110 may identify a time point at which the resource utilization rate information exceeds the resource utilization rate threshold (810). The fact that the resource utilization rate information exceeds the resource utilization rate threshold may mean that the resource for performing the first mode in which the change data is stored as the CDC file is insufficient.

When the resource utilization rate information exceeds the resource utilization rate threshold, the processor 110 may identify that the change data is currently processed in at least one mode between the first mode and the second mode (820). That is, the processor 110 may identify whether the corresponding change data is processed in the first mode in which the change data is stored as the CDC file or the second mode in which the change data is recorded in the memory in the situation where the resource for performing the first mode in which the current change data is stored as the CDC file is currently insufficient.

When the change data is currently stored in the CDC file (that is, the first mode) as the result of the identification, the processor 110 may change the first mode to the second mode so that the change data is processed in the second mode (821). In detail, the situation where the resource utilization rate information exceeds the resource utilization rate threshold and the change data is processed in the first mode may be the situation where the processor 110 performs the first mode in which the change data is stored as the CDC file in the situation where the resource for performing the first mode in which the change data is stored as the CDC file is insufficient. When the corresponding situation continues, the disk I/O and the CPU utilization rate increase, so that the utilization amount of the computing resource of the source database server 100 may increase. That is, the processor 110 changes the first mode to the second mode so that the change data is processed in the second mode in the foregoing situation, thereby minimizing the computing resource consumed in the source database server 100.

According to the exemplary embodiment of the present disclosure, when the resource utilization rate information is equal to or smaller than the resource utilization rate threshold, the processor 110 may determine to perform at least one operation among the operation of determining to reset the resource utilization amount based on the mode in which the change data is processed, an operation of changing the second mode to the first mode, and an operation of maintaining the first mode. A detailed description thereof will be provided below with reference to FIG. 6.

Referring to FIG. 6, the processor 110 may identify the time point at which the resource utilization rate information is equal to or smaller than the resource utilization threshold (710). The fact that the resource utilization rate information is equal to or smaller than the resource utilization rate threshold may mean that the resource for performing the first mode in which the change data is stored as the CDC file is sufficient.

When the resource utilization rate information is equal to or smaller than the resource utilization rate threshold, the processor 110 may identify whether remain log information is equal to or smaller than a remain threshold (720). When the remain log information is equal to or smaller than the remain threshold as the result of the identification 720, the processor 110 may identify that the change data is currently processed in at least one mode between the first mode and the second mode (730).

When the change data is not currently processed in the first mode as the result of the identification 730 (that is, the change data is processed in the second mode in which the change data is recorded in the memory), the processor 110 may change the second mode to the first mode so that the change data is processed in the first mode (732).

When the change data is currently processed in the second mode as the result of the identification 730, the processor 110 may maintain the first mode so that the additionally generated change data is processed in the first mode (731).

That is, the processor 110 may maintain the first mode or change the second mode to the first mode so that the change data is processed in the first mode in which the change data is stored as the CDC file in the case where the remain log information and the resource utilization rate information are equal to or smaller than the remain log threshold and the resource utilization rate threshold, respectively (that is, in the case where the difference between the redo log and the change data extracted from at least a part of the redo log is small and the resource for storing the change data as the CDC file is sufficiently secured).

When the resource utilization rate information is equal to or smaller than the resource utilization rate threshold, the processor 110 may identify that the remain log information exceeds the remain log threshold. The fact that the resource utilization rate information is equal to or smaller than the resource utilization rate threshold and the remain log information exceeds the remain log threshold may mean that the resource for processing the change data in the first mode is sufficient, but there are currently many archive redo logs in the memory. That is, the situation where the resource utilization rate information is equal to or smaller than the resource utilization rate threshold and the remain log information exceeds the remain log threshold may be the situation where the resources for storing the change data as the CDC file are sufficient, but the difference between the redo log and the change data extracted from the redo log is large (that is, the archive redo log cannot follow the online redo log).

In this case, the processor 110 may identify that the change data is currently processed in at least one mode between the first mode and the second mode (740). That is, the processor 110 may identify that the change data is processed in at least one mode between the first mode in which the change data is stored as the CDC file and the second mode in which the change data is recorded in the memory at the time point at which it is determined that the resources for processing the change data in the first mode are sufficient and the amount of archive redo logs currently possessed in the memory is large.

When the change data is currently processed in the second mode as the result of the identification 740, the processor 110 may change the second mode to the first mode so that the change data is stored as the CDC file (742). That is, when the resource utilization amount information is equal to or smaller than the resource utilization amount threshold, the remain log information exceeds the remain log threshold, and the change data is processed in the first mode, the processor 110 may determine that the resources for processing the change data in the first mode are sufficient and the memory currently possesses many archive redo logs to perform the first mode in which the change data is stored as the CDC file. Accordingly, the processor 110 may make the change data extracted from the archive redo log follow the online redo log including the information about the transaction real-time processed in the database system.

When the change data is currently processed in the first mode as the result of the identification 740, the processor 110 may determine to transmit a notification signal to the client (741). In detail, when it is determined that the resources for processing the change data in the first mode are sufficient and the memory currently possesses many archive redo logs, the processor 110 may process the change data in the first mode and store the change data as the CDC file so that the archive redo log follows the online redo log. However, the case where the memory currently possesses many archive redo logs despite the fact that the change data is already processed in the first mode in the foregoing situation may be an error of the system, so that the processor 110 may determine to generate a notification signal to help the client to check the corresponding system and transmit the generated notification signal to the client.

According to the exemplary embodiment of the present disclosure, the change data may include first change data extracted from the archive redo log and second change data extracted from the online redo log. When the processor 110 processes the second change data without processing the first change data after the processing of the first change data is completed, the processor 110 may determine to process the second change data in one mode between the first mode and the second mode based on at least one information between the remain log information and the resource utilization rate information. In particular, in the case where the processing of the first change data is completed because no further extraction of the archive redo log occurs in the source database server 100 in the situation where the first change data extracted from the archive redo log recorded in the memory is processed in one mode between the first mode and the second mode, the processor 110 may process the second change data extracted from the online redo log in one mode between the first mode and the second mode based on at least one information between the remain log information and the resource utilization rate information. In this case, the process of processing, by the processor 110, the change data extracted from the online redo log in one mode between the first mode and the second mode based on at least one information between the remain log information and the resource utilization rate information is the same as the foregoing process of processing the change data, so that a duplicate description will be omitted.

That is, in the case where the processor 110 processes the second change data after the processing of the first change data is completed, the processor 110 may process the second change data in the same mode as the processing mode of the first change data.

For example, in the case where the processor 110 processes all of the first change data in the situation where the first change data is processed in the second mode (that is, all of the change data extracted from the archive redo log are stored as the CDC files), the processor 110 may sequentially process the second change data in the first mode which is the same as the processing mode of the first change data.

For another example, in the case where the processor 110 processes all of the first change data in the situation where the first change data is processed in the second mode (that is, all of the change data extracted from the archive redo log is recorded in the memory), the processor 110 may subsequently process the second change data in the second mode which is the same as the processing mode of the first change data.

When the mode for processing the first change data is changed, the processor 110 may determine to change the mode for processing the second change data to correspond to the processing mode of the first change data. In particular, when the processing mode of the first change data is changed from the first mode to the second mode, the processor 110 may change the first mode to the second mode so that the processing mode of the second change data is the same as the changed processing mode of the first change data.

For example, in the case where all of the first change data is processed in the process of processing the first change data in the first mode and the first mode is changed to the second mode due to the rapid increase in the resource utilization amount by the source database server, the processor 110 may change the processing mode of the second change data from the first mode to the second mode so that the processing mode of the second change data is the same as the changed processing mode of the first change data.

For another example, when the processor 110 processes all of the first change data in the process of processing the first change data in the second mode and changes the second mode to the first mode due to the increase in the amount of archive redo log possessed in the memory, the processing mode of the second change data may be changed from the second mode to the first mode so that the processing mode of the second change data is the same as the changed processing mode of the first change data.

According to the exemplary embodiment of the present disclosure, the processor 110 may perform the processing on the first change data and the processing on the second change data in parallel. In particular, the processor 110 may process each of the first change data extracted from the archive redo log and the second change data extracted from the online redo log in one mode between the first mode and the second mode in parallel.

For example, the processor 110 may process the second change data extracted from the online redo log in the first mode simultaneously with processing the first change data extracted from the archive redo log in the first mode, and may also process the second change data extracted from the online redo log in the second mode simultaneously with processing the first change data extracted from the archive redo log in the second mode.

According to the exemplary embodiment of the present disclosure, the processor 110 may variably adjust at least one of the remain log threshold and the resource utilization rate threshold based on an operation log of the source database server 100. In particular, the processor 110 may efficiently adjust at least one of the remain log threshold and the resource utilization rate threshold through machine learning for the operation log of the source database server 100. The processor 110 may analyze the operation log that is a record for each time of the remain log information and the resource utilization rate information of the source database server 100. The processor 110 may learn a pattern for each time zone of the remain log information and the resource utilization rate information by analyzing the operation log, and vary the remain log threshold and the resource utilization rate threshold based on the pattern for each time zone of the remain log information and the resource utilization rate information. For example, because the redo logs including the transaction for the change in the data are generated relatively few in the early morning hours when the redo log is not generated, the processor 110 may adjust the remain log threshold to be small so as to allow a relatively small difference between the redo log and the remain redo log. For another example, the processor 110 may set the resource utilization rate threshold to be large so that the relatively large amount of archive redo logs is recorded in the memory in the early morning hours when the redo log is not generated. The particular description for the method of adjusting the remain log threshold and the resource utilization rate threshold by the processor is merely illustrative, and the present disclosure is not limited thereto.

According to the exemplary embodiment of the present disclosure, the processor 110 may acquire a log record including the information about the transaction processed by the source database server 100. The processor 110 may receive the redo log from the source database server 100 or access the redo log of the source database server 100. In the case where the data, the table, and/or the index are changed in the source database server 100 according to the transaction initiated by the client, the log record for the corresponding transaction may be recorded in the source database server 100.

In particular, the processor 110 may arrange the log records based on an order according to the generation time of the log records. For example, the processor 110 may arrange the log records based on a System Change Number (SCN). In this case, the processor 110 may acquire a log record for the change data by checking and analyzing the redo log for the transaction recorded in a log buffer and/or the log file in the source database server 100. In this case, the processor 110 may extract only the changed data by analyzing the redo log. The processor 110 may analyze the extracted log record based on one or more rules or a predetermined type of deep learning algorithm.

The processor 110 may identify a plurality of Structured Query Language (SQL) operations occurring for one or more objects associated with the transaction. In the SQL operation may mean a predetermined type of computation written in SQL. The SQL operation may include, for example, a Data Manipulation Language (DML) operation, a Data Definition Language (DDL) operation, and/or a Data Control Language (DCL) operation. In addition, the processor 110 may arrange the identified SQL operations in an order of the generation of the SQL operations.

The processor 110 may arrange the log records based on an order of the time of the generation of the log records. For example, the processor 110 may arrange the log records based on the SCN. That is, the processor 110 may arrange the log records of the source database server 100 in time series. Accordingly, the log record with the preceding SCN may be recorded before the log record with the subsequent SCN. The processor 110 may determine whether a previous SQL operation history for the object corresponding to an individual SQL operation exists in the CDC file based on the order of the generation of the plurality of identified SQL operations. In the present specification, the CDC file may mean the file organized in an order of the transactions (operations) transmitted from the source database server 100 to the target database server 200. The processor 110 may determine information to be recorded in the CDC file and record the determined information in the CDC file based on the existence of the previous SQL operation history in the CDC file.

For example, the processor 110 may determine whether the previous SQL operation history exists in the CDC file based on whether meta information about an object (for example, a table) corresponding to the SQL operation exists in the CDC file. Herein, the meta information may include at least one of table user information, table name information, column name information, column order information, and column type information. Further, the processor 110 may determine whether the previous SQL operation history exists in the CDC file based on whether a DML, operation or a DDL operation has been previously performed on the object corresponding to the SQL operation. The determination on the previous SQL operation history of the processor 110 may be performed on the entire objects associated with the transaction in an order of the generation of the SQL operation (for example, according to the temporal order relationship of the SCNs).

When the previous SQL operation history does not exist in the CDC file, the processor 110 may generate meta information about the corresponding object by using Data Dictionary (DD) information about the corresponding object, and when the previous SQL operation history exists in the CDC file, the processor 110 may determine not to generate meta information about the corresponding object. Further, when the meta information about the corresponding object is generated, the processor 110 may determine to record the SQL operation related to the corresponding object and the meta information in the CDC file, and when the meta information about the corresponding object is not generated, the processor 110 may determine to record the SQL operation related to the corresponding object in the CDC file.

The processor 110 may read the CDC file and transmit the read CDC file or the information recorded in the CDC file to the network unit 130 so as to allow the CDC file to be transmitted to the target database server. The processor 110 may also convert the CDC file or the information recorded in the CDC file into a format appropriate to the target database server 200.

As illustrated in FIG. 2, the target database server 200 may include a processor 210, a memory 220, and a network unit 230. The foregoing components are illustrative, and the scope of the present disclosure is not limited to the foregoing components. That is, depending on an implementation aspect for the exemplary embodiments of the present disclosure contents, additional components may be included or some of the foregoing components may be omitted.

According to the exemplary embodiment of the present disclosure, the network unit 230 may receive the CDC file or the information stored in the CDC file from the source database server 100 or the agent server 300. The network unit 230 may provide a communication function in the same type as that of the network unit 230 of the source database server 100.

According to the exemplary embodiment of the present disclosure, the memory 220 may store the predetermined type of information generated or determined by the processor 210 and the predetermined type of information received by the network unit 230 in the target database server 200. The memory 220 is a main storage device which the processor 210 directly accesses, such as a RAM including a DRAM and an SRAM, and may include a persistent storage medium and a volatile storage device in which stored information is instantly erased when a power supply is turned off.

According to the exemplary embodiment of the present disclosure, the processor 210 may record the CDC file or the information about the CDC file received from the source database server 100 in the CDC file of the target database server 200. For example, the processor 210 may determine to use the same file as the CDC file received from the source database server 100 as the CDC file of the processor 210 as it is or record the same information as the information about the CDC file in the CDC file.

The processor 210 may read the CDC file existing in the target database server 200. The processor 210 may read the CC file in an order of the record by the source database server 100.

The processor 210 may also determine data that needs to be changed and reflected in the target database server 200 based on the read CDC file. In this case, the processor 210 may perform an operation of comparing the data reflected to the target database server 200 with the data included in the read CDC file. Accordingly, the processor 210 may change and reflect only the minimum data for the target database server 200 later.

The processor 210 may also determine whether the corresponding meta information exists in the target database server 200 by reading the meta information recorded in the CDC file.

The processor 210 may check whether the meta information about the object is recorded in the CDC file. The processor 210 may determine whether the corresponding meta information exists in the target database server 200 by reading the meta information recorded in the CDC file. When the meta information does not exist, the processor 210 may load the meta information to the memory, and when the meta information exists, the processor 210 may use the existing meta information as it is. That is, the processor 210 determines whether to load the meta information based on whether the corresponding meta information has been loaded to the memory of the target database server 200, and when the corresponding meta information exists, the processor 210 may determine to use the corresponding meta information loaded to the target database server 200 without loading the meta information recorded in the CDC file to the memory.

The processor 210 may read the SQL operation recorded in the CDC file, and generate an SQL statement corresponding to the SQL operation by using the meta information in the memory corresponding to the read SQL operation. Further, the processor 210 may allow the change data of the source database server 100 to be finally reflected to the target database server 200 by applying the generated SQL statement to the target database server 200.

For example, the processor 210 may initially recognize the meta information in the received CDC file and load the corresponding meta data to the memory, and then recognize the SQL operation in the CDC file and then generate the SQL statement for the corresponding SQL operation by using the loaded meta data. After the generated SQL statement is reflected to the target database server 200, the processor 210 may recognize a commit for the transaction in the corresponding CDC file and reflect the commit to the target database server 200.

FIG. 3 is a flowchart illustrating an example of a CDC file generating method performed in the source database server (or the agent server) according to the exemplary embodiment of the present disclosure.

The operations illustrated in FIG. 3 are illustrative, and an additional operation may exist, or some of the corresponding operations may also be omitted. The operations illustrated in FIG. 3 may be performed in the source database server 100 or the agent server 300. For convenience of the description, hereinafter, the present disclosure will be described on an assumption that the operations are performed in the source database server 100.

According to the exemplary embodiment of the present disclosure, the processor 110 may extract change data from at least one redo log from the online redo log and the archive redo log (410). In particular, the processor 110 may extract the change data by identifying a change in the data in the source database system by reading and interpreting a redo log (online and archive redo logs) including information about a transaction processed in the source database system.

According to the exemplary embodiment of the present disclosure, the source database server 100 may analyze at least one information between remain log information and resource utilization rate information (420).

The remain log information may be information about at least one of the online redo log and the archive redo log from which the change data was not extracted. In particular, the remain log information may be information about a difference between the redo log (online and/or archive redo log) including information about the transaction generated according to the change in the structure and the organization of the data in the database and the change data extracted by the processor 110 from at least a part of the redo log.

The resource utilization rate information may be information on a computing resource currently used by the source database, and for example, information about a disk input/output utilization rate (disk I/O), a CPU utilization rate, and a memory utilization rate.

According to the exemplary embodiment of the present disclosure, the source database server 100 may determine to process the change data at least one mode between the first mode in which the archive redo log is stored as the CDC file or the second mode in which the archive redo log is recorded in the memory based on at least one information between the remain log information and the resource utilization rate information.

FIG. 8 is a diagram schematically illustrating the CDC operations performed in the database system according to the exemplary embodiment of the present disclosure.

FIG. 8 schematically illustrates the CDC operations performed in the database system according to the exemplary embodiment of the present disclosure. In FIG. 8, the operations performed between the source database server 100 and the target database server 200 are illustratively expressed.

As illustrated in FIG. 8, the source database server 100 may include a source DBMS 910 and the source processor 110. The source DBMS 910 may be operated by the processor 110 in the memory of the source database server 100.

Herein, the memory is a main storage device which a processor directly accesses, such as a RAM including a DRAM and a SRAM, and may mean a volatile storage device in which stored information is instantly erased when a power supply is turned off, but is not limited thereto. The memory may be operated by the processor as described above. The memory may store a predetermined type of data, such as change data. Otherwise, the memory may also store a data table and the like including a data value. In the exemplary embodiment of the present disclosure, the change data and/or the data value of the data table may be recorded in the persistent storage medium from the memory. In an additional aspect, the memory may include a buffer cache, and data may be stored in a data block of the buffer cache. The data may be recorded in the persistent storage medium by a background process.

In the present specification, the persistent storage medium means a non-volatile storage medium, which is capable of continuously storing predetermined data, such as a storage device based on a flash memory and/or a battery-backup memory, as well as a magnetic disk, an optical disk, and a magneto-optical storage device. The persistent storage medium may communicate with the processors and the memories of the database servers 100 and 200 through various communication means. In an additional exemplary embodiment, the persistent storage medium may be located outside the database servers 100 and 200 and communicate with the database servers 100 and 200.

The DBMS 910 and 1010 are the programs for allowing the database servers 100 and 200, to perform operations, such as search, insertion, correction, and deletion of the required data, and may be implemented by the processors 110 and 210 in the memories of the database servers 100 and 200 as described above. Further, the source DBMS 910 may determine to generate, manage, and store the redo log for the transaction generated in the source database server 100. The processor 110 may extract and analyze 930 the redo log stored for implementing the CDC operation, record the corresponding contents in the CDC file 970, read 950 the CDC file 970, and transmit 960 the CDC file to the target database server 200 through the network 140. The operations of the extraction 930, the record 940, the read 950, and the transmission 960 of the source processor 110 may correspond to the operations performed by the processor, which are described with reference to FIG. 2, respectively, as described above. In addition, the operations of the extraction 930, the record 940, the read 950, and the transmission 960 may be performed by individual threads, respectively. Further, the plurality of operations among the operations of the extraction 930, the record 940, the read 950, and the transmission 960 may also be performed by one thread. Further, the operations of the extraction 930, the record 940, the read 950, and the transmission 960 may also be performed by the individual processes, respectively, or one process may also perform the plurality of operations among the operations of the extraction 930, the record 940, the read 950, and the transmission 960.

According to the exemplary embodiment of the present disclosure, in the case where a commit operation for the transaction is performed, a CDC operation may be initiated by the source processor 110. For example, when the commit operation for the transaction is performed, the source processor 110 may perform the extraction operation 930. For another example, when the predetermined times of commit operation are performed (for example, when the commit operations for two transactions are performed), the source processor 110 may initiate the CDC operation for the plurality of transactions related to the corresponding commit operations. In another exemplary embodiment, the CDC operation of the source processor 110 may be initiated according to a predetermined time period or a predetermined SCN period.

As illustrated in FIG. 8, transactions 980 for a T1 object and a T2 object may enter from the source DBMS 910. The transactions 980 may include a first transaction and a second transaction. The first transaction may include a delete operation and a commit operation for the T1 object. The second transaction may include an insert operation for the T1 object, and an update operation and a commit operation for the T2 object. The SQL operations 980 performed in the source DBMS 910 may be arranged time-series and in the unit of the transaction based on a time point at which the commit operation is performed. In FIG. 8, since the commit operation for the first transaction is performed before the commit operation for the second transaction, the SQL operations for the first transaction may be disposed in the portions before the SQL operations for the second transaction.

The source processor 110 (for example, the extraction 930 thread) may extract the delete operation and the commit operation for the T1 object from the redo log, arrange the extracted operations in an order of time, and transmit the arranged operations to, for example, the read 940 thread. The read 940 thread may check the delete operation (that is, Delete T1) for the T1 object that is placed first, and determine whether a previous SQL operation history for the T1 object exists in the CDC file 970. For example, the read 940 thread may determine whether the DML or DDL operation has been previously performed on the T1 object. As illustrated in FIG. 8, since the SQL operation is not previously performed on the T1 object, the read 940 thread may generate meta information (that is, T1 DD) about the T1 object by using the DD information possessed in the memory. Then, the read 940 thread may record T1 DD that is the meta information about the T1 object and Delete T1 that is the delete operation for the T1 object in the CDC file 970. In this case, T1 DD that is the meta information may be recorded in a front portion of the CDC file compared to Delete T1 that is the SQL operation information. In addition, the read 940 thread may record the commit operation for the T1 object in the CDC file 970. In this case, the commit operation may be recorded in a rear portion of the CDC file 970 compared to the portion in which Delete T1 is recorded.

In the exemplary embodiment of the present disclosure contents, the extraction 930 thread may extract the insert operation for the T1 object, the update operation for the T2 object, and the commit operation of the second transaction included in the second transaction from the redo log. The extraction 930 thread may dispose the SQL operations in an order of Insert T1, Update T2, and the commit operation according to an order of the generation of the SQL operations. Since the commit operation of the second transaction is performed after the first transaction, the SQL operations for the first transaction among the SQL operations 980 performed in the source DBMS 910 may be arranged to be disposed before the SQL operations for the second transaction. The read 940 thread may read and process the Delete T1 and the commit operation for the first transaction and then read the operations related to the second transaction. The read 940 thread may read the insert operation (that is, insert T1) for the T1 object and determine whether the DML, or DDL for the T1 object is generated in the CDC file 970 (that is, whether the previous SQL operation history exists). In processing the operations (that is, Delete T1) related to the first transaction, the DD information about the T1 object is recorded in the CDC file 970, so that the read 940 thread may determine that the previous SQL operation history for the T1 object exists in the CDC file 970. In this situation, the read 940 thread may record the insert operation for the T1 object (that is, Insert T1) at a next record location in the CDC file 970 without generating meta information about the T1 object. Then, the read 940 thread may recognize the update operation for the T2 object. The read 940 thread may determine whether the previous SQL operation for the T2 object exists by checking the CDC file 970, and since the previous SQL operation does not exist, the read 940 thread may generate meta information for the T2 object (that is, T2 DD) by using the DD information about the T2 object stored in the memory. Then, the read 940 thread may record the meta information about the T2 object at a next location of the CDC file 970. Then, the read 940 thread may record the update operation for the T2 object (that is, Update T2) at a location subsequent to the location at which the meta information about the T2 object is recorded. In addition, the read 940 thread may record the commit operation for the T2 object in the CDC file 970. In this case, the commit operation may be recorded in a rear portion of the CDC file 970 compared to the portion in which Update T2 is recorded. The information 990 may be recorded in the CDC file 970 based on the commit time points for the transactions and the time of the generation of the operations by the foregoing method. Since all of the meta information and the SQL operation information are recorded in the single CDC file 970 by the same method, the CDC may be efficiently implemented. Further, only the meta information in which the commit operation is generated may be loaded from the memory of the source database server 100 and the information 990 is recorded in the CDC file 970 in an order according to the record rule according to the exemplary embodiments of the present disclosure content, so that the target database server 200 may easily reflect the change data to the DB of the target database server 200 while reading the change data in the order of the record of the change data in the single CDC file 970 written by the source database server 100. That is, the meta information about the object for which the SQL operation is generated among the objects of the source database server 100 may be recorded in the CDC file used when the target database server 200 reflects the change data to the DB of the target database server 200. By the method, the target database server 200 does not need to load the meta information for all of the objects to the memory of the target database server 200, and loads only the meta information about the objects related to the change data in the source database server 100 to the memory, so that the use of the memory in the database server is considerably decreased.

In an additional aspect of the present disclosure contents, the client and the database servers 100 and 200 or the database servers 100 and 200 may communicate with each other through a network (not illustrated). The network according to the exemplary embodiment of the present disclosure may use various wire communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems. Further, the network in the present specification may include a database link (dblink), and thus, the source database server 100 and the target database server 200 (or the agent server 300) may fetch the data from a different database server while communicating with each other through the database link. For example, the database link may include a database link from the source database server 100 to the target database server 200. The technologies described in the present specification may be used in other networks, as well as the foregoing networks.

As illustrated in FIG. 8, the target database server 200 may include a target DBMS 1010 and the target processor 210. The target DBMS 1010 may be operated by the target processor 210 in the memory of the target database server 200. The hardware configurations of the target database server 200 and the target DBMS 1010 are the same as the hardware configurations of the source database server 100 and the configuration of the source DBMS 910, so that the corresponding description thereof will be omitted herein.

The target processor 210 may receive 1030 the CDC file 970 for implementing the CDC operation, record 1040 the corresponding contents in the CDC file 1070 of the target processor 210 (or use the received CDC file 970 as the CDC file 1070 of the target processor 210 as it is), read 1050 the CDC file 1070, and reflect 1060 change data to the target DBMS 1010. The operations of the reception 1030, the record 1040, the read 1050, and the change/reflection 1060 of the target processor 210 may correspond to the operations performed by the processor 210 in FIG. 2, respectively, as described above. In addition, the operations of the reception 1030, the record 1040, the read 1050, and the change/reflection 1060 may be performed by individual threads, respectively. Further, the plurality of operations among the operations of the reception 1030, the record 1040, the read 1050, and the change/reflection 1060 may also be performed by one thread. Further, the operations of the reception 1030, the record 1040, the read 1050, and the change/reflection 1060 may also be performed by the individual processes, respectively, or one process may also perform the plurality of operations among the operations of the reception 1030, the record 1040, the read 1050, and the change/reflection 1060. Hereinafter, for convenience of the description, the CDC characteristics according to the exemplary embodiments of the present disclosure content will be described on an assumption that one process performs one module operation.

The target processor 210 (for example, the reception 1030 thread) of the target database server 200 may receive the CDC file 670 from the source database server 100. The target processor 210 of the target database server 200 may identically record the received CDC file 970 in the CDC file 1070 of the target processor 210 or may also use the received CDC file 970 as the CDC file 1070 of the target processor 210. The read 1050 thread of the target processor 210 may read information 1080 recorded in the CDC file 1070 and transmit the read information 1080 to the change/reflection 1060 thread.

The change/reflection 1060 thread may read meta information that is T1 DD first recorded in the CDC file 1070 and determine whether DD meta information for the T1 object exists in the memory of the target database server 200. When the meta information for the T1 object does not exist in the memory of the target database server 200, the target database server 200 may load T1 DD meta information to the memory of the target database server 200. Then, the change/reflection 1060 thread may check Delete T1 that is recorded after the information of T1 DD in the CDC file 1070. The change/reflection 1060 thread may automatically generate an SQL statement for performing the delete operation on the T1 object by using the T1 DD meta information loaded to the memory and reflect the generated SQL statement to the target DBMS 1010. Then, the change/reflection 1060 thread may check the commit and reflect the commit to the target DBMS 1010. Then, the change/reflection 1060 thread may check Insert T1 that is the next recorded information in the CDC file 1070. Since the operation is the operation for the T1 object, the change/reflection 1060 thread may generate an SQL statement for performing the Insert operation on the T1 object by using the meta information about the T1 object loaded to the memory.

The change/reflection 1060 thread may check T2 DD meta information recorded in a next location in the CDC file 1070. The change/reflection 1060 thread may inspect whether the DD meta information about the T2 object exists in the memory of the target database server 200. When it is determined that there is no meta information about the T2 object loaded to the memory of the target database server 200, the change/reflection 1060 thread may load the meta information for the T2 object (that is, the T2 DD meta information) to the memory of the target database server 200. Then, the change/reflection 1060 thread may recognize Update T2 recorded in a next location in the CDC file 1070. The change/reflection 1060 thread may load the meta information about the T2 object from the memory, and automatically generate an SQL statement corresponding to the update operation for the T2 object by using the meta information. Then, the change/reflection 1060 thread may reflect the SQL statement for performing the update operation on the T2 object to the DBMS 1010 of the target database server 200. Then, the change/reflection 1060 thread may check the commit and reflect the commit to the DBMS 1010.

According to the exemplary embodiment of the present disclosure contents, the record rule for the CDC file may include recording meta information about a specific object as the first priority and subsequently recording DML or DDL for a specific table. According to the exemplary embodiment of the present disclosure contents, the record rule for the CDC file is to determine an order of the transactions to be recorded in an order of occurrence of the commit and record the meta information before the SQL operation information, thereby enabling the CDC to be easily performed through transmitting the single CDC file. According to the exemplary embodiment of the present disclosure contents, the memory utilization amount is considerably decreased compared to the configuration in which all of the meta information is loaded to the memory and the CDC is implemented (that is, the configuration in which the meta information and the SQL operation information are managed by individual files), and it is possible to prevent the operation of the database server from being stopped in the situation of the DDL occurrence. Further, according to the CDC characteristics according to the exemplary embodiments of the present disclosure, it is possible to innovatively decrease the utilization amount of the memory compared to the existing structure in reflecting the DML or the DDL for the plurality of tables.

The CDC implementation methods in which the meta information and the SQL operation information are separately managed share the separate files recording the meta information about the entire objects while transceiving the separate files between both database servers. Accordingly, the implementation methods require that the target database server 200 also possesses the DD information about an object for which the DML has not occurred in the memory. That is, the target database server 200 needs to possess the DD information about all objects (for example, the table) or as many object as possible in the memory according to the memory capacity. Further, in this case, when the DDL occurs, even though the file recorded with the meta information needs to be manually generated and transmitted or the file recorded with the meta information is automatically transmitted, the source database server 100 needs to stand by in an idle state until the transmission of the meta file is completed. However, the CDC implementation methods according to the exemplary embodiment of the present disclosure contents do not require the separate generation and transmission of a meta file in which meta information is stored, and do not generate an idle state of the source database server 100. Accordingly, the CDC implementation methods according to the exemplary embodiment of the present disclosure contents may allow real-time DDL synchronization. Further, the CDC implementation methods according to the exemplary embodiment of the present disclosure contents manage the DD information for the table for which the DML occurs, thereby efficiently managing the memory in the target database server 200. For example, the DD for one CDC file may be managed in relation to the read/record and the DD for the DML generation object may be managed in relation to the change/reflection, so that a more resource-efficient CDC may be implemented.

FIG. 9 is a diagram schematically illustrating the CDC operations performed in the database system according to the exemplary embodiment of the present disclosure.

FIG. 9 schematically illustrates the CDC operations performed in the database system according to the exemplary embodiment of the present disclosure.

In the exemplary embodiment illustrated in FIG. 9, the DDL characteristic is added to the exemplary embodiment illustrated in FIG. 8, and the common contents with the exemplary embodiments of FIG. 8 will be omitted below for convenience of the description. For example, operations of an extraction 1130, a record 1140, a read 1150, and a transmission 1160 in FIG. 9 may correspond to the operations of the extraction 930, the record 940, the read 950, and the transmission 960 in FIG. 8, respectively. Further, operation of a reception 1230, a record 1240, a read 1250, and a change/reflection 1260 in FIG. 9 may correspond to the operations of the reception 1030, the record 1040, the read 1050, and the change/reflection 1060 in FIG. 8, respectively. Further, a source DBMS 1110 and a target DBMS 1210 in FIG. 9 may correspond to the source DBMS 910 and the target DBMS 1010 in FIG. 8, respectively.

As illustrated in FIG. 9, transactions 1180 may enter the source DBMS 1110. In the example of FIG. 9, the transactions 1180 may include a first transaction including Insert T1, Update T2, and Commit, a second transaction including Delete T3 and Commit, and a third transaction including DDL 1. The source processor 110 may arrange the operations included in the entered transactions in an order of occurrence time as illustrated by reference number 1180. For example, the extraction 1130 thread may analyze a redo log for the transactions generated in the source DBMS 1110 and extract and arrange information about the changed data as illustrated by reference number 1180.

Even through the second transaction starts later than the first transaction, a commit time point of the second transaction is earlier than a commit time point of the first transaction, so that the source processor 110 may record the SQL operations related to the second transaction to the CDC file 1170 earlier than the SQL operations related to the first transaction. The SQL operations related to the transactions may be recorded in the CDC file 1170 according to the time order generated in the transaction.

As illustrated in FIG. 9, the record 1140 thread may recognize that a delete operation is performed on a T3 object in the second transaction. The record 1140 thread may check whether meta information about the T3 object exists in the CDC file 1170. That is, the record 1140 thread may check whether there is a previous SQL performance history for the T3 object in the CDC file 1170. Since the meta information about the T3 object does not exist, the record 1140 thread generates meta information about the T3 object by using the DD information loaded to the memory and records the generated meta information (that is, T3 DD #1) in the CDC file 1170. Then, the record 1140 thread may record a delete operation for the T3 object (that is, Delete T3) in the CDC file 1170. In addition, the record 1140 thread may record the commit operation for the second transaction in the CDC file 1170. The record location of the commit operation is the rear of the recording location of Delete T3.

The record 1140 thread may start the record of the commit operation for the first transaction in the CDC file 1170 after completing the record of the commit operation for the second transaction in the CDC file 1170. The record 1140 thread may check Insert T1 and inspect whether the meta information about the T1 object exists in the CDC file 1170. As illustrated in FIG. 9, since only the meta information about the T3 object is currently recorded in the CDC file 1170, the record 1140 thread may generate the meta information about the T3 object with the DD information (for example, the DD information about the T3 object) of the memory. Then, the record 1140 thread may record the generated meta information about the T3 object (that is, TT DD #1) in the CDC file 1170. Then, the record 1140 thread may record the previously checked Insert T1 operation at a location after the position at which the meta information is recorded in the CDC file 1170. The record 1140 thread may check the Update T2 operation that is the SQL operation generated after the Insert T1 in the first transaction. The record 1140 thread may inspect whether the meta information about the T2 object exists in the CDC file 1170. Since the meta information about the T3 object and the meta information about the T2 object are currently recorded in the CDC file 1170, the record 1140 thread may determine that the meta information about the T2 object does not exist. In this case, the record 1140 thread may generate the meta information about the T2 object by referring to the DD information about the T2 object loaded to the memory. Then, the record 1140 thread may record the generated meta information about the T2 object in the CDC file 1170. The meta information about the T2 object may be recorded at a location subsequent to the recording location of the Insert T1 recorded immediately before. Then, the record 1140 thread may subsequently record the Update T2 operation corresponding to the recorded meta information in the CDC file 1170. Then, the record 1140 thread may record the commit operation for the first transaction in the CDC file 1170. The recording location of the commit operation is the rear of the recording location of the Update T2.

The record 1140 thread may check the third transaction (including DDL T1) after reflecting all of the operations for the first transaction. The record 1140 thread may check the type for the SQL operation and determine that the type for the SQL operation is the DDL type. That is, when it is determined that the type for the SQL operation is the DDL type, the record 1140 thread may determine to determine whether the previous SQL operation history for the object corresponding to the DML, operation exists in the CDC file 1170. Further, when it is determined that the type for the SQL operation is the DDL operation, the record 1140 thread does not determine whether the previous SQL operation history for the object corresponding to the DDL operation exists in the CDC file 1170, but may determine to generate meta information for the object corresponding to the DDL operation based on the DDL operation and record the generated meta information in the CDC file. Accordingly, the record 1140 thread may generate the meta information corresponding to the DDL operation for the T1 object and record DDL Ti in the CDC file 1170 as illustrated in FIG. 9.

The read 1150 thread may read he CDC file 1170 recorded by the record 1140 thread and transmit the read CDC file 1170 to the transmission 1160 thread. The transmission 1160 thread may transmit the received CDC file 1170 to the target database server 200 through the network 140.

The target processor 210 of the target database server 200 may receive the CDC file 1170 by the reception 1230 thread. The record 1240 thread of the target processor 210 may record the information recorded in the received CDC file 1170 in the CDC file 1270 of the target processor 1220 in the same order. Otherwise, the record 1240 thread of the target processor 210 may also use the received CDC file 1170 as the CDC file 1270 of the target processor 1220 as it is. Accordingly, the CDC file 1270 of the target database server 200 may include information in the order recorded in the source database server 100 as illustrated by reference number 1280.

The read 1250 thread of the target database server 200 may transmit the information 1280 recorded in the CDC file 1270 to the change/reflection 1220 thread, and the change/reflection 1220 thread may reflect the received information to the target DBMS 1210 and perform synchronization of the target DBMS 1210 and the source DBMS 1210. The change/reflection 1220 thread may perform the reflection of the received information to the target DBMS 1210 in the order of the record of the information illustrated by reference number 1280. The meta information about the specific SQL operation is first recorded and then corresponding SQL operation information may be recorded in the CDC file 1270 and the corresponding meta information is recorded for the DDL operation, so that the target database server 200 does not need to load the meta information for many objects to the memory of the target database server 200 and may process the reflection by loading the meta information for the object for which the DML occurs. The particular reflection method has been described with reference to FIG. 8, so that the description thereof will be omitted in FIG. 9.

FIG. 10 is a diagram illustrating means for performing the CDC in the database system according to an exemplary embodiment of the present disclosure.

According to the exemplary embodiment of the present disclosure, a computer program may be implemented by following means.

According to the exemplary embodiment of the present disclosure, the computer program may include a means for extracting change data from at least one redo log between an online redo log and an archive redo log, a means for analyzing at least one information between remain log information and resource utilization rate information of a source database server, and a means for determining to process the change data in one mode between a first mode in which the change data is stored as a CDC file or a second mode in which the change data is recorded in a memory based on at least one information between the remain log information and the resource utilization rate information.

Alternatively, the remain log information may be information about the online redo log and the archive redo log which do not extract the change data, and the resource utilization rate information may be information about a resource utilization rate currently used by the source database server.

Alternatively, the means for determining whether process the change data in one mode between the first mode in which the change data is stored as the CDC file or the second mode in which the change data is recorded in the memory based on at least one information between the remain log information and the resource utilization rate information may include a means for determining to process the change data in one mode between the first mode and the second mode based on at least one of a result of a comparison between the remain log information and a remain log threshold and a result of a comparison between the resource utilization rate information and a resource utilization rate threshold.

Alternatively, the means for determining to process the change data in one mode between the first mode in which the change data is stored as the CDC file or the second mode in which the change data is recorded in the memory based on at least one information between the remain log information and the resource utilization rate information may include a means for processing the change data in the first mode when the remain log information exceeds the remain log threshold.

Alternatively, the means for processing the change data in the first mode when the remain log information exceeds the remain log threshold may include a means for identifying that the change data is processed in one mode between the first mode and the second mode, a means for determining to reset the resource utilization rate threshold when the change data is processed in the first mode, and a means for changing the second mode to the first mode when the change data is processed in the second mode.

Alternatively, the means for determining to process the change data in one mode between the first mode in which the change data is stored as the CDC file or the second mode in which the change data is recorded in the memory based on at least one information between the remain log information and the resource utilization rate information may include a means for comparing the resource utilization rate information and resource utilization rate threshold information when the remain log information exceeds the remain log threshold, and a means for determining to perform the operation of at least one of the means for processing the change data in the first mode based on the comparison result and the means for determining to reset the resource utilization rate threshold.

Alternatively, the means for determining to perform the operation of at least one of the means for processing the change data in the first mode based on the comparison result and the means for determining to reset the resource utilization rate threshold may include a means for resetting the resource utilization rate threshold when the resource utilization rate information exceeds the resource utilization rate threshold and a means for processing the change data in the first mode when the resource utilization rate information is equal to or smaller than the resource utilization rate threshold.

Alternatively, the means for determining to process the change data in one mode between the first mode in which the change data is stored as the CDC file or the second mode in which the change data is recorded in the memory based on at least one information between the remain log information and the resource utilization rate information may include a means for identifying whether the resource utilization rate information exceeds the resource utilization rate threshold and a means for processing the change data in the second mode when the resource utilization rate information exceeds the resource utilization rate threshold.

Alternatively, the means for processing the change data in the second mode when the resource utilization rate information exceeds the resource utilization rate threshold may include a means for identifying that the change data is processed in one mode between the first mode and the second mode, a means for changing the first mode to the second mode when the change data is processed in the first mode, and a means for identifying a usable resource of the source database server in order to reset the resource utilization rate threshold when the change data is processed in the second mode.

Alternatively, the means for determining to process the change data in one mode between the first mode in which the change data is stored as the CDC file or the second mode in which the change data is recorded in the memory based on at least one information between the remain log information and the resource utilization rate information may include a means for determining to process the change data in one mode between the first mode and the second mode based on the resource utilization rate information when the remain log information is equal to or smaller than the remain log threshold.

Alternatively, the means for determining to process the change data in one mode between the first mode and the second mode based on the resource utilization rate information when the remain log information is equal to or smaller than the remain log threshold may include a means for identifying that the change data is processed in one mode between the first mode and the second mode when the resource utilization rate information exceeds the resource utilization rate threshold, a means for changing the first mode to the second mode when the change data is processed in the first mode, and a means for identifying a usable resource of the source database server in order to reset the resource utilization rate threshold when the change data is processed in the second mode.

Alternatively, the means for determining to process the change data in one mode between the first mode and the second mode based on the resource utilization rate information when the remain log information is equal to or smaller than the remain log threshold may include a means for identifying that the change data is processed in one mode between the first mode and the second mode when the resource utilization rate information is equal to or smaller than the resource utilization rate threshold, a means for maintaining the first mode when the change data is processed in the first mode, and a means for changing the second mode to the first mode when the change data is processed in the second mode.

Alternatively, the remain log threshold is a criterion of the online redo log and the archive redo log which need to be extracted as the change data, the resource utilization rate threshold is a criterion of a resource utilization rate which the source database server currently uses to store the change data extracted from at least one redo log between the online redo log and the archive redo log as a CDC file, and at least one of the remain log threshold and the resource utilization rate threshold is variable by machine learning based on an operation log of the source database server.

Alternatively, the change data may include first change data extracted from the archive redo log and second change data extracted from the online redo log, and the means for determining to process the change data in one mode between the first mode in which the change data is stored as the CDC file or the second mode in which the change data is recorded in the memory based on at least one information between the remain log information and the resource utilization rate information may include a means for determining to process the second change data in one mode between the first mode or the second mode based on at least one information between the remain log information and the resource utilization rate information when the second change data is processed without processing the first change data after the processing of the first change data is completed.

Alternatively, the change data may include first change data extracted from the archive redo log and second change data extracted from the online redo log, and the computer program may further include a means for determining to change a mode for processing the second change data to correspond to a mode for processing the first change data when a mode for processing the first change data is changed.

Alternatively, the processing for the first change data and the processing for the second change data may be performed in parallel.

Alternatively, the computer program may further include a means for recording meta information for an object, for which an SQL operation occurs, among objects of the source database server in the CDC file, and the meta information may include at least one information among table user information, table name information, column name information, column order information, and column type information.

Alternatively, the means for recording meta information for an object, for which an SQL operation occurs, among objects of the source database server in the CDC file may further include a means for generating meta information about the corresponding object by using DD information for the corresponding object when a previous SQL operation history does not exist in the CDC file, and a means for determining not to generate meta information for the corresponding object when the previous SQL operation history exists in the CDC file.

Alternatively, the means for recording meta information for an object, for which an SQL operation occurs, among objects of the source database server in the CDC file may include a means for determining to record the SQL operation related to the corresponding object and the meta information in the CDC file when the meta information for the corresponding object is generated, and a means for determining to record the SQL operation related to the corresponding object in the CDC file when the meta information for the corresponding object is not generated.

According to the exemplary embodiment of the present disclosure, the means for performing the CDC in the database system may also be implemented by module, circuit, or logic for implementing a computing device.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

FIG. 11 is a simple and general schematic diagram illustrating an example of a computing environment in which exemplary embodiments of the present disclosure are implementable.

The present disclosure has been generally described in relation to a computer executable command executable in one or more computers, but those skilled in the art will appreciate well that the present disclosure may be implemented in combination with other program modules and/or in a combination of hardware and software.

In general, a module in the present specification includes a routine, a procedure, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer storage medium includes a Read Only Memory (RAM), a Read Only Memory (ROM), Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1500 including a computer 1502 and implementing several aspects of the present disclosure is illustrated, and the computer 1502 includes a processing device 1504, a system memory 1506, and a system bus 1508. The system bus 1508 connects system components including the system memory 1506 (not limited) to the processing device 1504. The processing device 1504 may be a predetermined processor among various commonly used processors. A dual processor and other multi-processor architectures may also be used as the processing device 1504.

The system bus 1508 may be a predetermined one among several types of bus structure, which may be additionally connectable to a local bus using a predetermined one among a memory bus, a peripheral device bus, and various common bus architectures. The system memory 1506 includes a ROM 1510, and a RAM 1512. A basic input/output system (BIOS) is stored in a non-volatile memory 1510, such as a ROM, an erasable and programmable ROM (EPROM), and an EEPROM, and the BIOS includes a basic routine helping a transport of information among the constituent elements within the computer 1502 at a time, such as starting. The RAM 1512 may also include a high-rate RAM, such as a static RAM, for caching data.

The computer 1502 also includes an embedded hard disk drive (HDD) 1514 (for example, enhanced integrated drive electronics (EIDE) and serial advanced technology attachment (SATA))—the embedded HDD 1514 being configured for outer mounted usage within a proper chassis (not illustrated)—a magnetic floppy disk drive (FDD) 1516 (for example, which is for reading data from a portable diskette 1518 or recording data in the portable diskette 1518), and an optical disk drive 1520 (for example, which is for reading a CD-ROM disk 1522, or reading data from other high-capacity optical media, such as a DVD, or recording data in the high-capacity optical media). A hard disk drive 1514, a magnetic disk drive 1516, and an optical disk drive 1520 may be connected to a system bus 1508 by a hard disk drive interface 1524, a magnetic disk drive interface 1526, and an optical drive interface 1528, respectively. An interface 1524 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1502, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate well that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1530, one or more application programs 1532, other program modules 1534, and program data 1536 may be stored in the drive and the RAM 1512. An entirety or a part of the operation system, the application, the module, and/or data may also be cached in the RAM 1512. It will be appreciated well that the present disclosure may be implemented by several commercially usable operation systems or a combination of operation systems.

A user may input a command and information to the computer 1502 through one or more wired/wireless input devices, for example, a keyboard 1538 and a pointing device, such as a mouse 1540. Other input devices (not illustrated) may be a microphone, an IR remote controller, a joystick, a game pad, a stylus pen, a touch screen, and the like. The foregoing and other input devices are frequently connected to the processing device 1504 through an input device interface 1542 connected to the system bus 1508, but may be connected by other interfaces, such as a parallel port, an IEEE 1394 serial port, a game port, a USB port, an IR interface, and other interfaces.

A monitor 1544 or other types of display devices are also connected to the system bus 1508 through an interface, such as a video adaptor 1546. In addition to the monitor 1544, the computer generally includes other peripheral output devices (not illustrated), such as a speaker and a printer.

The computer 1502 may be operated in a networked environment by using a logical connection to one or more remote computers, such as remote computer(s) 1548, through wired and/or wireless communication. The remote computer(s) 1548 may be a work station, a server computer, a router, a personal computer, a portable computer, a microprocessor-based entertainment device, a peer device, and other general network nodes, and generally includes some or an entirety of the constituent elements described for the computer 1502, but only a memory storage device 1550 is illustrated for simplicity. The illustrated logical connection includes a wired/wireless connection to a local area network (LAN) 1552 and/or a larger network, for example, a wide area network (WAN) 1554. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1502 is used in the LAN networking environment, the computer 1502 is connected to the local network 1552 through a wired and/or wireless communication network interface or an adaptor 1556. The adaptor 1556 may make wired or wireless communication to the LAN 1552 easy, and the LAN 1552 also includes a wireless access point installed therein for the communication with the wireless adaptor 1556. When the computer 1502 is used in the WAN networking environment, the computer 1502 may include a modem 1558, is connected to a communication server on a WAN 1554, or includes other means setting communication through the WAN 1554 via the Internet. The modem 1558, which may be an embedded or outer-mounted and wired or wireless device, is connected to the system bus 1508 through a serial port interface 1542. In the networked environment, the program modules described for the computer 1502 or some of the program modules may be stored in a remote memory/storage device 1550. The illustrated network connection is illustrative, and those skilled in the art will appreciate well that other means setting a communication link between the computers may be used.

The computer 1502 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may implement the function described by various schemes for each specific application, but it shall not be construed that the determinations of the implementation depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

As the described above, the relevant contents are described in the best mode for implementing the present disclosure.

The present disclosure may be used in a database server, a database management computing device, and the like.

What is claimed is:

1. A computer program stored a non-transitory computer readable storage medium, wherein if the computer program is executed by one or more processors the computer program performs operations for Change Data Capture (CDC) by one or more processors, and the operations comprises:
   extracting a change data from at least one redo log of an online redo log and an archive redo log;
   analyzing at least one information of a resource utilization rate information and a remain log information of a source database server; and
   determining to process the change data in one mode of a first mode saving the change data as a CDC file and a second mode recording the change data in a memory, based on at least one of the remain log information and the resource utilization rate information.

2. The computer program according to claim 1, wherein the remain log information is information for an online redo log and an archive redo log, which do not extract a change data, and wherein the resource utilization rate information is information for a resource utilization rate which the source database server currently uses.

3. The computer program according to claim 1, wherein the determining to process the change data in one mode of a first mode saving the change data as a CDC file and a second mode recording the change data in a memory, based on at least one of the remain log information and the resource utilization rate information, comprising:
   determining to process the change data in one mode of the first mode and the second mode, based on at least one of a comparison result between the remain log information and a remain log threshold and a comparison result between the resource utilization rate information and a resource utilization rate threshold.

4. The computer program according to claim 1, wherein the determining to process the change data in one mode of a first mode saving the change data as a CDC file and a second mode recording the change data in a memory, based on at least one of the remain log information and the resource utilization rate information, comprising:
processing the change data in the first mode if the remain log information exceeds a remain log threshold.

5. The computer program according to claim 4, wherein the processing the change data in the first mode if the remain log information exceeds a remain log threshold, comprising:
identifying that the change data is processed in one mode of the first mode and the second mode;
determining to reset a resource utilization rate threshold if the change data is processed in the first mode; and
converting from the second mode to the first mode if the change data is processed in the second mode.

6. The computer program according to claim 1, wherein the determining to process the change data in one mode of a first mode saving the change data as a CDC file and a second mode recording the change data in a memory, based on at least one of the remain log information and the resource utilization rate information, comprising:
comparing the resource utilization rate information and a resource utilization rate threshold if the remain log information exceeds a remain log threshold; and
determining to perform at least one operation of processing the change data in the first mode and determining to reset the resource utilization rate threshold, based on the comparison result.

7. The computer program according to claim 6, wherein the determining to perform one operation of operation for processing the change data in the first mode and operation for resetting the resource utilization rate threshold, based on the comparison result, comprising:
resetting the resource utilization rate threshold if the resource utilization rate information exceeds the resource utilization rate threshold; and
processing the change data in the first mode if the resource utilization rate information is the resource utilization rate threshold or less.

8. The computer program according to claim 1, wherein the determining to process the change data in one mode of a first mode saving the change data as a CDC file and a second mode recording the change data in a memory, based on at least one of the remain log information and the resource utilization rate information, comprising:
identifying whether the resource utilization rate information exceeds a resource utilization rate threshold; and
processing the change data in the second mode if the resource utilization rate information exceeds the resource utilization rate threshold.

9. The computer program according to claim 8, wherein the processing the change data in the second mode if the resource utilization rate information exceeds the resource utilization rate threshold, comprising:
identifying that the change data is processed in one mode of the first mode and the second mode;
converting from the first mode to the second mode if the change data is processed in the first mode; and
identifying a usable resource of the source database server to reset the resource utilization rate threshold if the change data is processed in the second mode.

10. The computer program according to claim 1, wherein the determining to process the change data in one mode of a first mode saving the change data as a CDC file and a second mode recording the change data in a memory, based on at least one of the remain log information and the resource utilization rate information, comprising:
determining to process the change data in one mode of the first mode and the second mode based on the resource utilization rate information, if the remain log information is a remain log threshold or less.

11. The computer program according to claim 10, wherein the determining to process the change data in one mode of the first mode and the second mode based on the resource utilization rate information, if the remain log information is a remain log threshold or less, comprising:
identifying that the change data is processed in one mode of the first mode and the second mode if the resource utilization rate information exceeds a resource utilization rate threshold;
converting from the first mode to the second mode if the change data is processed in the first mode; and
identifying a usable resource of the source database server to reset the resource utilization rate threshold if the change data is processed in the second mode.

12. The computer program according to claim 10, wherein the determining to process the change data in one mode of the first mode and the second mode based on the resource utilization rate information, if the remain log information is a remain log threshold or less, comprising:
identifying that the change data is processed in one mode of the first mode and the second mode if the resource utilization rate information is a resource utilization rate threshold or less;
maintaining the first mode if the change data is processed in the first mode; and
converting from the second mode to the first mode if the change data is processed in the second mode.

13. The computer program according to claim 3, wherein the remain log threshold is a criterion of the archive redo log and the online redo log which need to be extracted as the change data,
wherein the resource utilization rate threshold is a criterion of a resource utilization rate which the source database server currently uses to store a change data extracted from at least one redo log of the online redo log and the archive redo log, as a CDC file, and
wherein at least one of the remain log threshold and the resource utilization rate threshold are variable by machine learning based on an operation log of the source database server.

14. The computer program according to claim 1, wherein the change data comprises a first change data extracted from the archive redo log and a second change data extracted from the online redo log, and
wherein the determining to process the change data in one mode of a first mode saving the change data as a CDC file and a second mode recording the change data in a memory, based on at least one of the remain log information and the resource utilization rate information, comprising:
determining to process a processing mode of the second change data in one mode of the first mode and the second mode, based on at least one information of the remain log information and the resource utilization rate information, if processing for the second change data without processing for the first change data after finishing processing the first change data.

15. The computer program according to claim 1, comprising:
wherein a first change data extracted from the archive redo log and a second change data extracted from the online redo log;
and further comprising:

determining to change a mode for processing the second change data to correspond to a mode for processing the first change data if a mode for processing the first change data is changed.

16. The computer program according to claim 15, wherein the processing for the first change data and the processing for the second change data are processed in parallel.

17. The computer program according to claim 1, further comprising:
   recording a meta information for an object, which occurs Structured Query Language (SQL) operation of objects of the source database server, to the CDC file; and
   wherein the meta information comprises at least one information of a table user information, a table name information, a column name information, a column order information, and a column type information.

18. The computer program according to claim 17, wherein the recording a meta information for an object, which occurs SQL operation of objects of the source database server, to the CDC file, comprising:
   generating a meta information for the object using Data Dictionary (DD) information for the object when there is no former record of SQL operation from the CDC file; and
   determining not to generate a meta information for the object, if there is a former record of SQL operation from the CDC file.

19. The computer program according to claim 17, wherein the recording a meta information for an object, which occurs SQL operation of objects of the source database server, to the CDC file, comprising:
   determining to record the meta information and SQL operation regarding the object to the CDC file if a meta information of the object is generated; and
   determining to record SQL operation regarding the object to the CDC file if a meta information regarding the object is not generated.

20. A database server to implement Change Data Capture (CDC) comprising:
   a processor comprising one or more of core;
   a memory storing executable program codes by the processor; and
   a network unit transmitting and receiving data from a source database server and a target database server;
   wherein the processor extracts a change data from at least one redo log of an online redo log and an archive redo log, analyzes at least one information of a resource utilization rate information and a remain log information of a source database server, and determines to process the change data in one mode of a first mode saving the change data as a CDC file and a second mode recording the change data in a memory, based on at least one of the remain log information and the resource utilization rate information.

21. A method to implement Change Data Capture (CDC) comprising:
   extracting a change data from at least one redo log of an online redo log and an archive redo log;
   analyzing at least one information of a resource utilization rate information and a remain log information of a source database server; and
   determining to process the change data in one mode of a first mode saving the change data as a CDC file and a second mode recording the change data in a memory, based on at least one of the remain log information and the resource utilization rate information.

* * * * *